US007406605B2

(12) United States Patent
Yokosawa

(10) Patent No.: US 7,406,605 B2
(45) Date of Patent: Jul. 29, 2008

(54) INFORMATION RECORDING MEDIUM, MANUFACTURING METHOD OF ITS RECORDING MEDIUM, INFORMATION PROCESS UNIT AND COPYRIGHT MANAGEMENT SYSTEM

(75) Inventor: Teruhisa Yokosawa, Kawasaki (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 733 days.

(21) Appl. No.: 10/277,090

(22) Filed: Oct. 22, 2002

(65) Prior Publication Data

US 2003/0099363 A1 May 29, 2003

(30) Foreign Application Priority Data

| Oct. 24, 2001 | (JP) | ............................. 2001-326796 |
| Dec. 12, 2001 | (JP) | ............................. 2001-379141 |
| Aug. 27, 2002 | (JP) | ............................. 2002-247729 |

(51) Int. Cl.
*G06F 12/14* (2006.01)
*G11B 5/82* (2006.01)
*G11B 19/04* (2006.01)

(52) U.S. Cl. .................. 713/193; 726/29; 360/135; 360/60

(58) Field of Classification Search ................ 713/193; 726/29; 360/135, 60
See application file for complete search history.

(56) References Cited

U.S. PATENT DOCUMENTS

| 5,336,586 | A | * | 8/1994 | Togawa et al. ............... 430/316 |
| 5,661,800 | A | * | 8/1997 | Nakashima et al. ........... 726/27 |
| 5,892,900 | A | | 4/1999 | Ginter et al. |
| 5,949,876 | A | | 9/1999 | Ginter et al. |
| 6,094,318 | A | * | 7/2000 | Kim ............................. 360/60 |
| 6,477,649 | B2 | | 11/2002 | Kambayashi et al. |
| 6,496,935 | B1 | * | 12/2002 | Fink et al. ...................... 726/13 |
| 6,556,537 | B1 | * | 4/2003 | Endoh ...................... 369/275.4 |
| 6,598,161 | B1 | * | 7/2003 | Kluttz et al. ................. 713/166 |
| 6,671,114 | B2 | * | 12/2003 | Bang ........................... 360/48 |
| 6,732,106 | B2 | * | 5/2004 | Okamoto et al. ............ 707/100 |
| 6,832,319 | B1 | * | 12/2004 | Bell et al. .................... 713/193 |
| 6,834,346 | B1 | | 12/2004 | Ishibashi et al. |
| 6,868,403 | B1 | * | 3/2005 | Wiser et al. .................... 705/51 |

(Continued)

FOREIGN PATENT DOCUMENTS

JP 01-113959 5/1989

(Continued)

OTHER PUBLICATIONS

Translated Publication (writer: Douglas R. Stinson), 1996.

(Continued)

*Primary Examiner*—Emmanuel L. Moise
*Assistant Examiner*—Michael Pyzocha
(74) *Attorney, Agent, or Firm*—Venable, LLP; Michael A. Sartori; Catherine M. Voorhees

(57) ABSTRACT

Medium individual information formed an information recording medium is obtained, and a management key used for recording or regeneration on the information recording medium corresponding to the medium individual information is generated, and the predetermined information is encoded to create encode data by using the management key when recording predetermined information, the encode data recorded on the information recording medium is decoded to create decode data by using the transferred management key when regenerating the predetermined information.

22 Claims, 34 Drawing Sheets

U.S. PATENT DOCUMENTS

| | | |
|---|---|---|
| 6,983,050 B1 | 1/2006 | Yacobi et al. |
| 2001/0036030 A1* | 11/2001 | Sacks et al. .................... 360/75 |
| 2002/0015494 A1* | 2/2002 | Nagai et al. .................. 380/201 |
| 2002/0016919 A1* | 2/2002 | Sims, III ..................... 713/193 |
| 2003/0156716 A1 | 8/2003 | Yokosawa |
| 2004/0013267 A1 | 1/2004 | Yokosawa |
| 2004/0133793 A1 | 7/2004 | Ginter et al. |
| 2005/0005148 A1 | 1/2005 | Ishibashi et al. |

FOREIGN PATENT DOCUMENTS

| | | |
|---|---|---|
| JP | 03-014109 | 1/1991 |
| JP | 07-131452 | 5/1995 |
| JP | 08-030451 | 2/1996 |
| JP | 08-044451 | 2/1996 |
| JP | 10-013784 | 1/1998 |
| JP | 2000-090039 | 3/2000 |
| JP | 2000-113586 | 4/2000 |
| JP | 2001-148156 | 5/2001 |

OTHER PUBLICATIONS

Japanese Office Action dated Dec. 25, 2007 issued in Japanese Patent Application in Priority Application No. 2002-247729 and an English translation of the Office Action.

* cited by examiner

DISPLAY PROCESS OF ORDINARY DIGITAL AV INFORMATION WHICH IS NOT ENCRYPTED

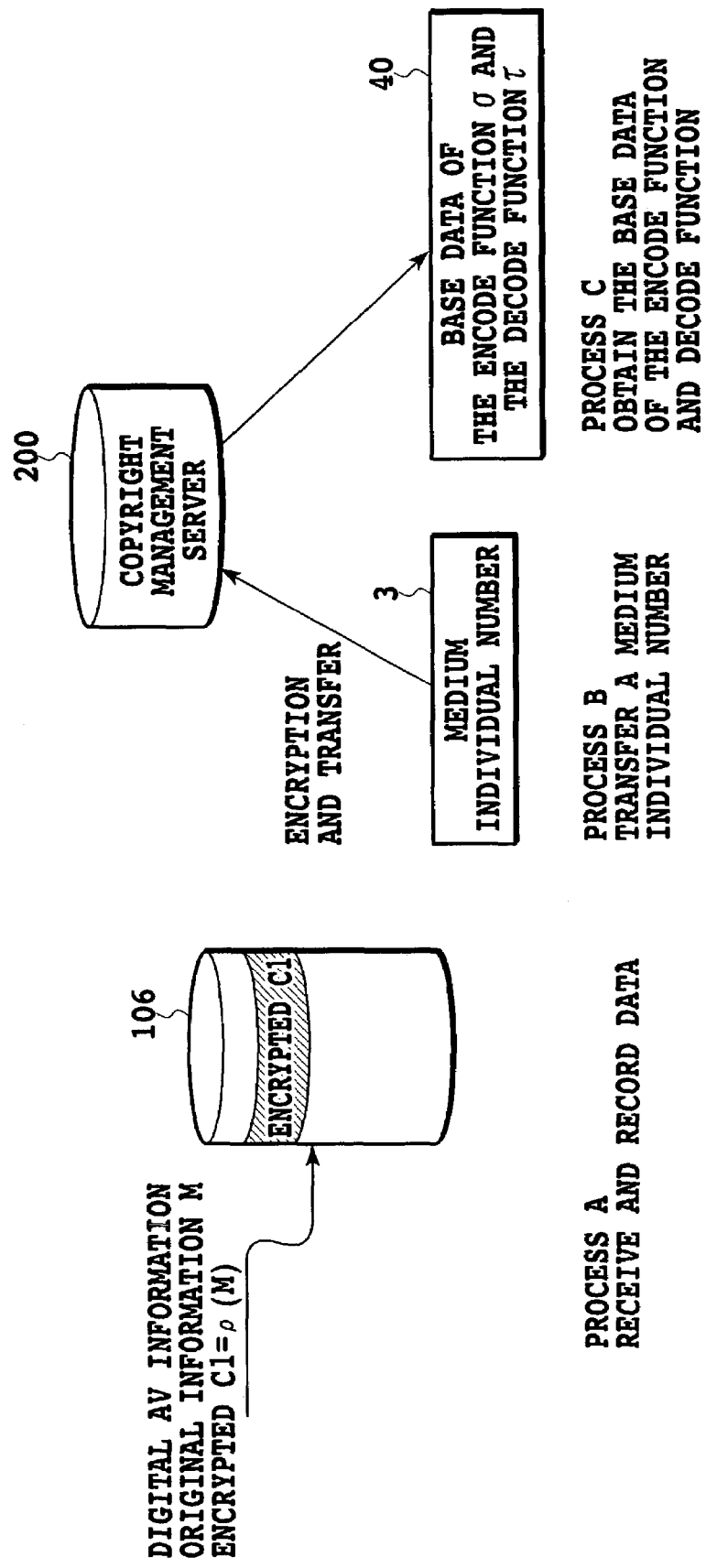

RE-ENCRYPTION
INDIVIDUAL TO
THE RECORDING MEDIUM
OF DIGITAL AV
INFORMATION
$C2 = \sigma(C1)$

PROCESS E
ENCRYPTION INDIVIDUAL
TO THE RECORDING MEDIUM

PROCESS D
CREATE ENCODE FUNCTION
AND DECODE FUNCTION

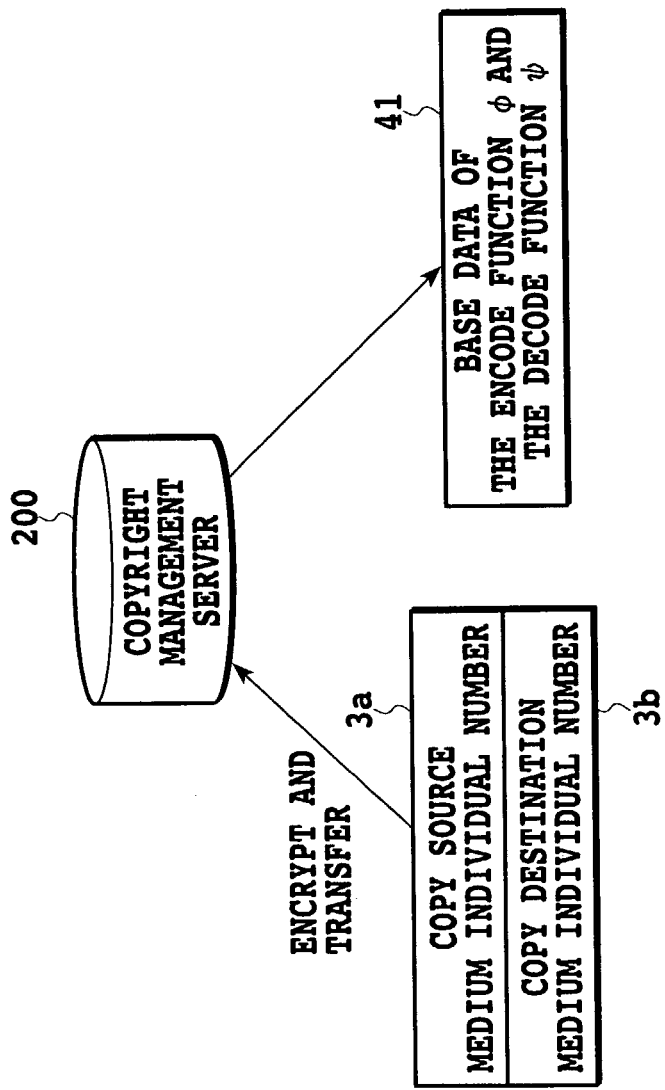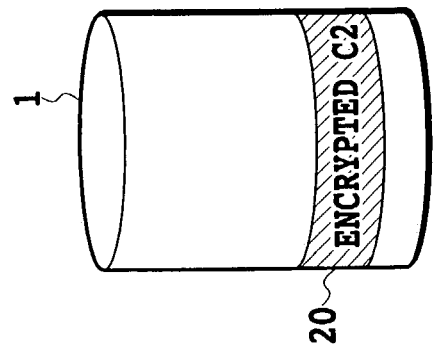

RE-ENCRYPTION INDIVIDUAL
TO THE COPY DESTINATION RECORDING
MEDIUM OF DIGITAL AV INFORMATION
ENCRYPTED C3 = φ(C2)

PROCESS E
ENCRYPTION INDIVIDUAL
TO THE RECORDING MEDIUM

PROCESS D
CREATE THE ENCODE FUNCTION
AND THE DECODE FUNCTION

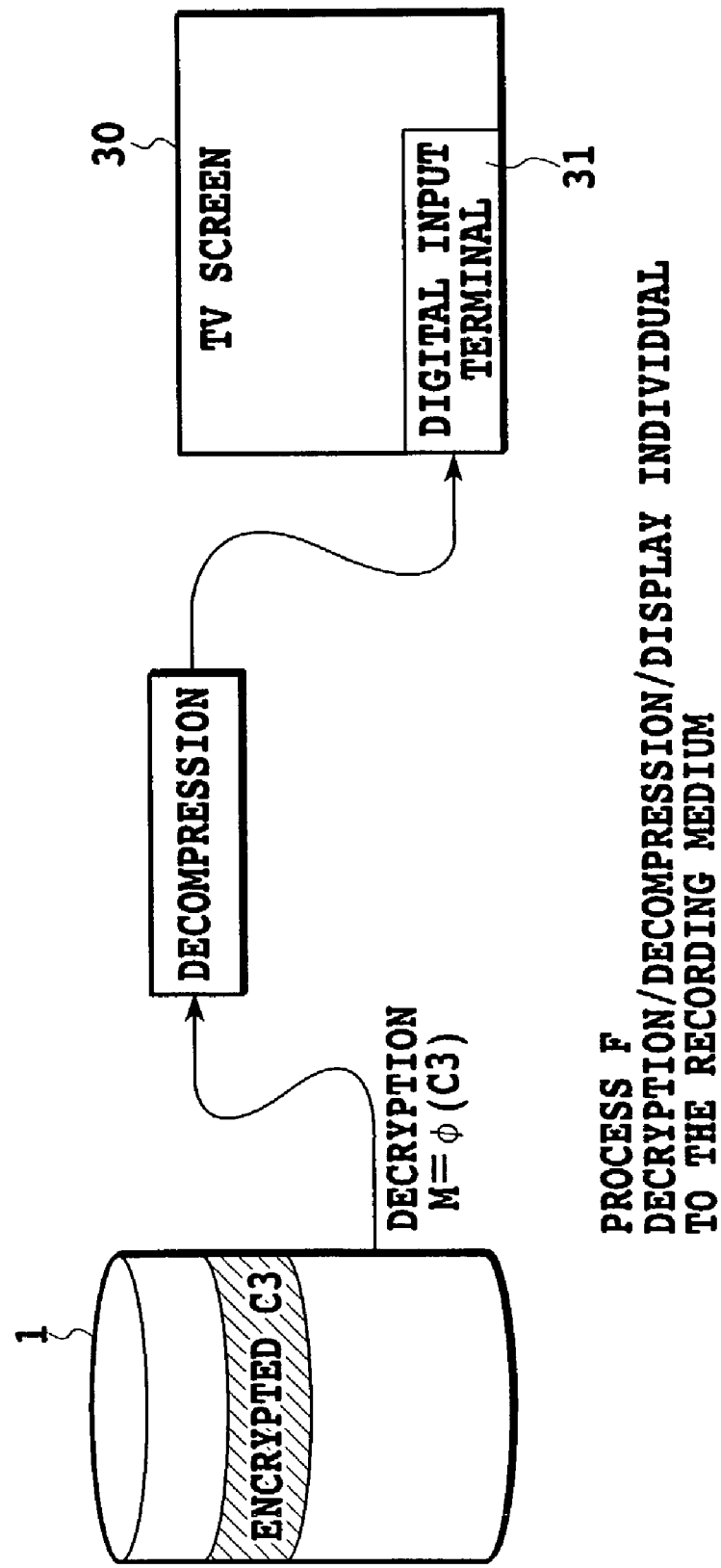

FIG.18A        FIG.18B
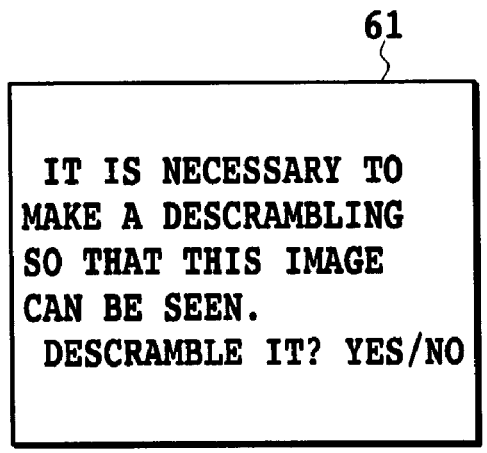
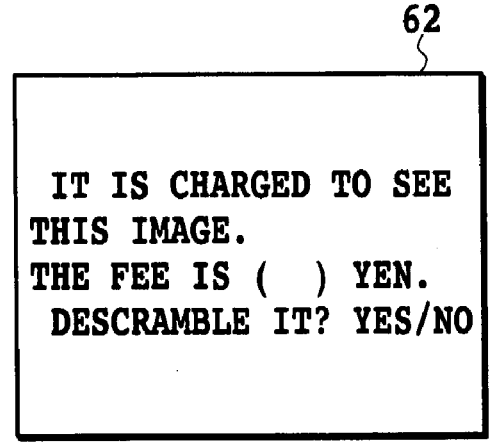
MESSAGE WHEN DISPLAYING
THE ENCRYPTED DIGITAL AV INFORMATION

IT IS NECESSARY TO MAKE A DESCRAMBLING SO THAT THIS IMAGE CAN BE COPIED.
 DESCRAMBLE AND COPY IT? YES/NO

TO COPY THIS IMAGE, THE FEE OF ( ) YEN IS CHARGED.
 PAYING THE FEE IN ORDER TO DESCRAMBLE AND COPY ? YES/NO

MESSAGE WHEN COPYING THE ENCRYPTED
DIGITAL AV INFORMATION

DISPLAY PROCESS OF ORDINARY DIGITAL AV INFORMATION
WHICH IS NOT ENCRYPTED

DIGITAL AV INFORMATION
ORIGINAL INFORMATION M
ENCRYPTED C1 = $\rho$ (M)

PROCESS A
RECEIVE AND RECORD DATA

RE-ENCRYPTION OF
DIGITAL AV INFORMATION
INDIVIDUAL TO THE
RECORDING MEDIUM
C2 = $\sigma$ (C1)

PROCESS B
ENCRYPTION INDIVIDUAL
TO THE RECORDING MEDIUM

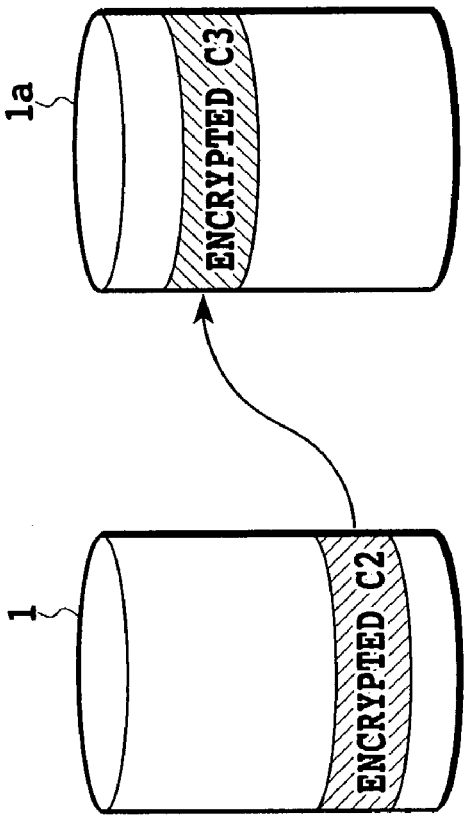
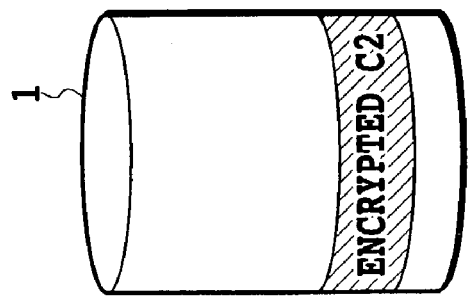

PROCESS E
DECRYPTION, DECOMPRESSION AND DISPLAY
INDIVIDUAL TO THE RECORDING MEDIUM

INFORMATION RECORDING MEDIUM, MANUFACTURING METHOD OF ITS RECORDING MEDIUM, INFORMATION PROCESS UNIT AND COPYRIGHT MANAGEMENT SYSTEM

This application is based on Japanese Patent Application Nos. 2001-326796 filed Oct. 24, 2001, 2001-379141 filed Dec. 12, 2001 and 2002-247729 filed Aug. 27, 2002, the contents of which are incorporated hereinto by reference.

BACKGROUND OF THE INVENTION

1. Field of the Invention

The present invention relates to an information recording medium, a manufacturing method of its recording medium, an information process unit and a copyright management system. More particularly, the invention is applied to a field of copyright protection technology for reading and writing digital AV information by using information individual to a magnetic disk medium and non-rewritable, and further the invention is capable of recording and reproducing copyrighted digital AV information while securely protecting the copyright.

2. Description of the Related Art

Conventionally, an information recording medium for a computer is required to copy digital information correctly, where it is recorded and regenerated as the same digital information no matter how many times it is repeatedly copied or even if it is copied on another recording medium.

While digital AV information can be obtained from the information record media such as the Internet, a digital broadcast and a DVD, it can be copied once accumulated as the digital information and then the copyright thereof can no longer be protected. Although there are copy protection technologies and so on, copying becomes possible, in the case of copy control information for instance, just by deleting or rewriting this information. This is ascribable to the fact that a magnetic disk unit mainly used as an external storage of the computer is capable of reading and rewriting all the data according to an instruction from the computer. The magnetic disk unit freely allows all recorded data to be read and written in order to securely store programs and data of the computer.

(Problems in the Prior Art)

(Problem 1)

In recent years, however, the act of copying itself leads to infringement of the copyright in the case of the copyrighted digital information such as the digital AV information (Audio-Visual information).

Currently, the information recording medium such as the DVD embedded with a scramble code that cannot be regenerated without descrambling copyright protection is not perfect because a hacker or the like creates a program and so on for releasing the protection.

Thus, there is a first problem that the copyright protection is not perfect as to the information recording medium itself such as a magnetic disk medium.

(Problem 2)

Consequently, a digital record system incorporating the copyright protection is now required apart from the record system used on the computers so far. In particular, a digital broadcast and so on must receive special attention because, as the same radio wave is received by all the receivers, individually different encryption is difficult and then the digital AV information may be copied and illegally used if once decrypted.

Here, it will be described more concretely.

As for the copyrighted digital AV information, a function of freely allowing reading and writing of all the data recorded on the information recording medium is very dangerous, where it is possible to analyze the digital AV information and an unprotect key by rewriting the program of the computer. Once the digital AV information is thereby decrypted, there is a fear that the digital AV information leaks all over the world through the Internet and so on. It has been impossible to completely prevent it since control by programming is possible in the range of an interface with the computer.

For that reason, in order to handle the copyrighted digital AV information, it is necessary to add a function different from the conventional magnetic disk unit capable of reading and rewriting all the data recorded on the information recording medium based on an instruction from the computer.

In addition, there are the cases where the copyright protection is implemented by using an encryption process, yet it is possible to unprotect the copyright relatively easily by a technique performing directly analyzing with a logic analyzer or the like an interface route between the computer and a recording apparatus or a signal line with the Internet connecting the computer to an external server or by a technique providing a pseudo signal looking as if authenticated. In particular, the unprotect key or encryption key is smaller in capacity than the encrypted digital AV information, and so it is easy to directly read or rewrite the content of the information. In the case where it is cracked, the digital AV information is decrypted and is no longer secure however advanced the performed encryption is.

Thus, there is a second problem that it is not possible to record and regenerate the copyrighted digital AV information while securely protecting the copyright.

SUMMARY OF THE INVENTION

Thus, a first object of the present invention is to provide an information recording medium, a manufacturing method of its recording medium, an information process unit and a copyright management system capable of protecting digital information recorded on the information recording medium as non-rewritable as well as individual to the information recording medium.

In addition, a second object of the present invention is to provide the information recording medium, manufacturing method of its recording medium, information process unit and copyright management system capable of allowing only a person oneself to freely and assuredly record and reproduce predetermined information such as digital AV information by creating an environment in which a copy to be needed is possible and an illegal copy cannot be performed while protecting copyright.

In the first aspect of the present invention, there is provided an information recording medium capable of recording and regenerating information, the medium comprising:

medium individual information, that is provided at one or more locations in the medium, including an individual number or an individual data for identification of the medium.

In the second aspect of the present invention, there is provided a manufacturing method of an information recording medium having a data area for recording digital information and a servo area with concave and convex portions, the method comprising:

a first step for writing servo information by recording signals of different polarities corresponding to the concave and convex portions of the servo area;

a second step for writing the individual information different piece by piece on the concave portion provided to a part of the data area; and a third step for writing the digital information to the data area.

In the third aspect of the present invention, there is provided a copyright management system comprised of a management server and an information process unit for performing an information recording and regenerating process, the system comprising:

by using the above mentioned information recording medium;

obtaining means for, by the information process unit, obtaining the medium individual information provided to the information recording medium;

individual information transferring means for transferring the obtained medium individual information to the management server;

key generating means for generating a management key to be used for recording or regeneration on the information recording medium corresponding to the transferred medium individual information;

key transferring means for transferring the generated key to the information process unit;

encoding means for, by using the transferred management key, encoding the predetermined information to create encode data when recording predetermined information, and decoding means for, by using the transferred management key, decoding the encode data recorded on the information recording medium to create decode data when regenerating the predetermined information.

In the fourth aspect of the present invention, there is provided a server for exchanging information with an information processing apparatus, comprising:

by using the above mentioned information recording medium;

obtaining means for obtaining the medium individual information located in the information recording medium via the information process unit;

key generating means for generating a management key used for recording or regeneration on the information recording medium corresponding to the medium individual information transferred via the information process unit;

key transferring means for transferring the generated key to the information process unit.

In the fifth aspect of the present invention, there is provided an information process unit for recording and regenerating information, the unit comprising:

by using the above mentioned information recording medium;

obtaining means for obtaining the medium individual information located in the information recording medium;

encoding means for, by using a management key generated corresponding to the obtained medium individual information and to be used for recording or regeneration on the information recording medium, encoding the predetermined information to create encode data when recording predetermined information; and decoding means for, by using the management key, decoding the encode data recorded on the information recording medium to create decode data when regenerating the predetermined information, wherein:

the management key generated corresponding to the medium individual information has an encode function or a decode function;

the encode function is used to encode the predetermined information or to re-encode the encode data; and the decode function is used to decode the encode data.

In the sixth aspect of the present invention, there is provided a copyright management method for managing copyright information between a management server and an information process unit, the method comprising the steps of:

by using the above mentioned information recording medium obtaining, by the information process unit, the medium individual information located in the information recording medium;

transferring the obtained medium individual information to the management server;

generating a management key, used for recording or regeneration on the information recording medium, corresponding to the transferred medium individual information;

transferring the generated key to the information process unit;

encoding, by using the transferred management key, the predetermined information to create encode data when recording predetermined information, and decoding, by using the transferred management key, the encode data recorded on the information recording medium to create decode data when regenerating the predetermined information, wherein:

the management key generated corresponding to the medium individual information has an encode function or a decode function;

the encode function is used to encode the predetermined information or to re-encode the encode data; and the decode function is used to decode the encode data.

In the seventh aspect of the present invention, there is provided a copyright management system comprised of a management server and an information process unit for performing an information recording and regenerating process, wherein the unit includes the above mentioned information recording medium, the system comprising:

selecting means for, based on an instruction for start encryption by the management server, selecting desired digital information and the information process unit of a transfer destination;

key transferring means for transferring a public key to the selected information process unit via communication means;

individual information encrypting means for, by the information process unit, reading medium individual information as a decryption key of a cipher recorded in the information recording medium and encrypting the read medium individual information by using the transferred public key;

individual information transferring means for transferring the encrypted medium individual information to the management server via the communication means;

digital information encrypting means for, by the management server, encrypting the digital information by using the encrypted medium individual information so that a decoding process can be performed by the encrypted medium individual information;

digital information transferring means for transferring the encrypted digital information to the information process unit via the communication means;

recording means for, by the information process unit, recording the transferred encrypted digital information in the information recording medium; and digital information decoding means for decoding the encrypted digital information recorded in the information recording medium by using the medium individual information as the decryption key.

In the eighth aspect of the present invention, there is provided a server for exchanging information with an information process unit having the above mentioned information recording medium, the server comprising:

selecting means for selecting desired digital information and the information process unit according to a transfer destination based on an instruction for starting encryption;

key transferring means for transferring a public key to the selected information process unit via communication means;

digital information encrypting means for encrypting the digital information by using the medium individual information so that a decoding process to be performed by the medium individual information encrypted and transferred by the information process unit; and digital information transferring means for transferring the encrypted digital information to the information process unit via the communication means.

In the ninth aspect of the present invention, there is provided an information process unit for recording and regenerating information, and for having the above mentioned information recording medium, the unit comprising:

individual information encrypting means for reading medium individual information as a decryption key of a cipher recorded in the information recording medium, and encrypting the read medium individual information by using a public key transferred from a server;

individual information transferring means for transferring the encrypted medium individual information to the management server via the communication means;

recording means for recording the encrypted digital information transferred from the server in the information recording medium; and digital information decoding means for decoding the encrypted digital information recorded in the information recording medium by using the medium individual information as the decryption key.

In the tenth aspect of the present invention, there is provided a copyright management method for managing copyright information between a management server and an information process unit, wherein the unit having the above mentioned information recording medium, the method comprising the steps of:

selecting, by the management server, desired digital information and the information process unit according to a transfer destination based on an instruction for starting encryption;

transferring a public key to the selected information process unit via communication means;

reading, by the information process unit, medium individual information as a decryption key of a cipher recorded in the information recording medium, and encrypting the read medium individual information by using the transferred public key;

transferring the encrypted medium individual information to the management server via the communication means;

encrypting, by the management server, the digital information by using the encrypted medium individual information so that a decoding process can be performed based on the medium individual information;

transferring the encrypted digital information to the information process unit via the communication means;

recording, by the information process unit, the transferred encrypted digital information in the information recording medium; and decoding the encrypted digital information recorded in the information recording medium by using the medium individual information as the decryption key.

The above and other objects, effects, features and advantages of the present invention will become more apparent from the following description of embodiments thereof taken in conjunction with the accompanying drawings.

BRIEF DESCRIPTION OF THE DRAWINGS

FIGS. 11A and 11B are explanatory views showing the display process of the digital AV information which is encrypted;

FIGS. 15A and 15B are explanatory views showing the display process of the digital AV information which is encrypted;

FIGS. 17A and 17B are explanatory views showing the display process of the digital AV information which is encrypted following FIGS. 16A and 16B;

FIGS. 18A and 18B are explanatory views showing a message when displaying the digital AV information which is encrypted;

FIGS. 19A and 19B are explanatory views showing a message of a copying process of the digital AV information which is encrypted;

FIGS. 32A and 32B are explanatory views showing the display process of the digital AV information which is encrypted;

DETAILED DESCRIPTION OF PREFERRED EMBODIMENTS

Figure 1:
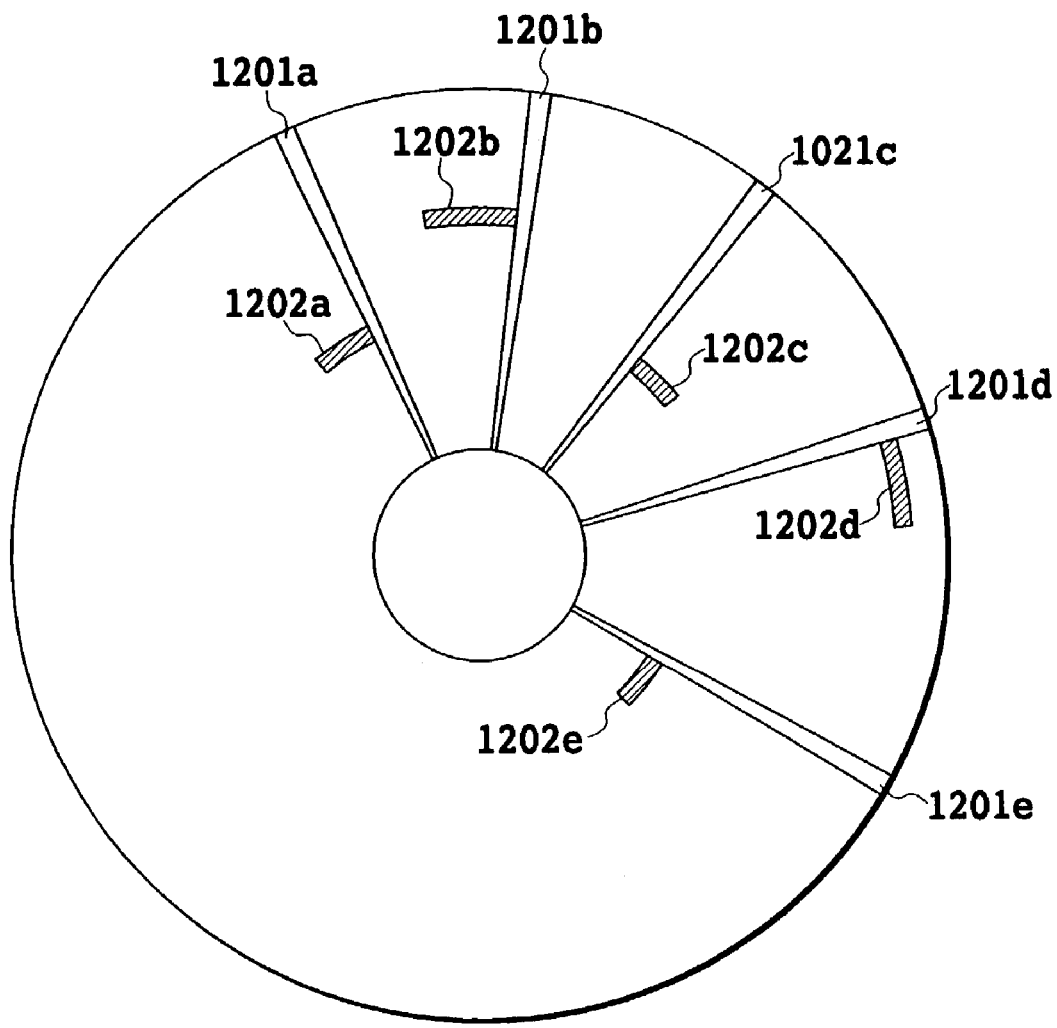
FIG. 1 is a plan view showing a magnetic recording medium according to a first embodiment of the present invention.

Hereafter, embodiments of the present invention will be described in detail by referring to the drawings.

Hereafter, before explaining of concrete examples, a general description will be made as to the necessity of the copyright management system.

(Overview)

An overview of the present invention will be described.

(1) To solve the aforementioned first and second problems, it is necessary to change, for the sake of copyright protection, all of a magnetic disk unit for recording digital AV information, a copyright management server for managing the digital AV information, and routes for communicating data thereof.

As an important item for protecting the copyright, information individual to a magnetic disk medium (i.e. individual information) should be stored in an information recording medium incorporated in a magnetic disk unit. It becomes possible, by using this individual information, to protect the copyright by various methods. As for this individual information, a plurality of individual informations should be stored in the magnetic disk medium, thus improving security. In addition, it is important that once written individual information is never written again.

(2) One of the methods of protecting the copyright of the digital AV information by using this individual information is as follows.

The information individual to the magnetic disk medium is transferred to the copyright management server that manages copyrighted digital AV information not to be known to anyone. The copyright management server encrypts the copyrighted digital AV information based on cryptography that can only be decoded by the transferred individual information. The encrypted digital AV information is transferred to the magnetic disk unit and is recorded. The recorded digital AV information is decoded by using the information individual to the magnetic disk medium, and then the decoded information can be seen as an image or heard as music.

As the information individual to the magnetic disk unit or magnetic disk medium is used, the digital AV information that is encrypted and stored cannot be actually seen or heard even if it is read or copied, on condition that the individual information is not to be known.

Here, it is important how to send the information individual to the magnetic disk unit or magnetic disk medium securely to the copyright management server. In the case of using an interface with an existing computer of the magnetic disk unit, a danger of being decrypted on its way is high. First, an electric signal is exchanged at the interface portion between the magnetic disk unit and the computer, and so the electric signal can be read by monitoring. In addition, as for a transfer from the computer to the copyright management server via the Internet, by creating a dummy copyright management server on the Internet and requesting a read instruction of the individual information, the information is decrypted.

For that reason, as for the transfer of the individual information, it is important to transfer the information to the copyright management server without using an existing interface. As this method, the transfer by communication using radio is effective. In general, it is possible, by combining digital radio modulation and digital cryptography, to securely transfer the individual information so as not to be decrypted. As the transfer based on the digital radio only can be performed encryption information and the individual information, a low transfer rate is not a problem so that a one-chip portable telephone and so on may also be used.

Actually, there is no problem when the encrypted digital AV information may be transferred at high speed by using the ordinary Internet.

As the individual information is such important information not to be decrypted, it makes no sense to be easily read by the read instruction from the computer. For this reason, it is necessary that, unlike ordinary data, the individual information cannot be read and written concerning physical reading and writing of the magnetic disk even if there is the instruction from the computer. By the control structure based on a CPU incorporated in the magnetic disk unit, the individual information portion is enabled to invisible from the computer like a management area such as a servo area.

Even if the digital AV information is thus strictly managed, it makes no sense to have the digital information hacked at the final stage for outputting as the image. Therefore, it is necessary to decompress the information compressed by MPEG-2 or the like immediately after decoding the digital AV information.

Since the decompressed digital AV information has such large amounts of data, the information is difficult to record without any other process. In the case of compressing and recording the decompressed information again, the digital AV information is deteriorated and thus the original digital AV information can be protected. This reason is that as ordinary compression based on MPEG-2 or the like uses non-inverse conversion, the image and voice deteriorate in the case where the once compressed data is decompressed and then compressed again.

(3) In addition, it can be used as follows as a different method of using the individual information of the magnetic disk medium.

In the encryption function individual to the magnetic disk medium, both an encryption function and a decryption function individual to the digital AV information are further prepared, and the encryption process is performed by using these two or more encryption functions. As the information is recorded with different encryption function per each digital AV information and each record medium, decryption cannot be decrypted without the two decryption functions of the record medium and the digital AV information or more than two decryption functions.

To see the digital AV information, the encryption function individual to the digital AV information is necessary, and the copyright can be protected on condition of incorporating a mechanism of accounting when obtaining those functions.

Such an encryption process of using two or more encryption functions do not exist in the prior art.

In contrast, in the present invention, the conventional cryptography is mainly the one-to-one performing between the encryption process and decrypting process. As the function of performing the encryption process by using two or more encryption functions, the function wherein each element of the product of a matrix regards a remainder of a predetermined prime number as a solution. As for this function, the matrix itself is the encryption function, and a new encryption function is generated by multiplying one matrix by a new matrix and by acquiring the remainder of the determined prime number. When decoding this cryptography, each element of the product of the matrix regards the remainder of the same prime number as the solution by using an inverse function of the encryption function. As a calculation can also be performed among the inverse functions, it is possible to perform decoding by one calculation when finally performing a decoding process.

As characteristics of this encryption function, it is capable of creating any number of new encryption functions by calculating the matrix, the same calculation as the encryption can be used when performing the decoding process, and a danger of having the cryptography decrypted decreases because it takes enormous time to calculate an inverse matrix if the determined prime number is rendered as a large value and the number of arranged matrixes is also rendered large.

(4) Next, means for giving an individual number as well as performing non-rewritable to each medium will be described.

First, a data area for writing the individual number is located at a position lower than an ordinary data area (long distance from a magnetic head). Next, in a manufacturing process of the medium, a write current of the head is written as a larger value than usual to the area for writing the individual number in a state of the lowered number of revolutions and the lowered amount of levitation of the head.

As for the information thus written, the data cannot be overwritten because the amount of levitation of the head is higher and the write current is lower than writing at an ordinary drive, and thus it is possible to add the information which cannot be erased later.

Hereafter, the present invention will be described by taking concrete examples based on consideration of the ideas described above.

FIRST EXAMPLE

A first embodiment of the present invention will be described based on FIGS. 1 to 3B.

This example is corresponding to claims 1 to 13, and relates to the information recording medium and a manufacturing method of its recording medium.

Hereafter, it will be described by taking concrete examples.

(Information Recording Medium)

FIG. 1 shows the magnetic recording medium as the information recording medium related to the present invention.

Servo information in PERM is written to servo areas 1201*a* to 1201*e* existing on boundaries of sectors. Each sector surrounded by the servo areas 1201*a* to 1201*e* has a data area for recording the digital information and individual information areas 1202*a* to 1202*e* on an arbitrary track.

Figure 2:
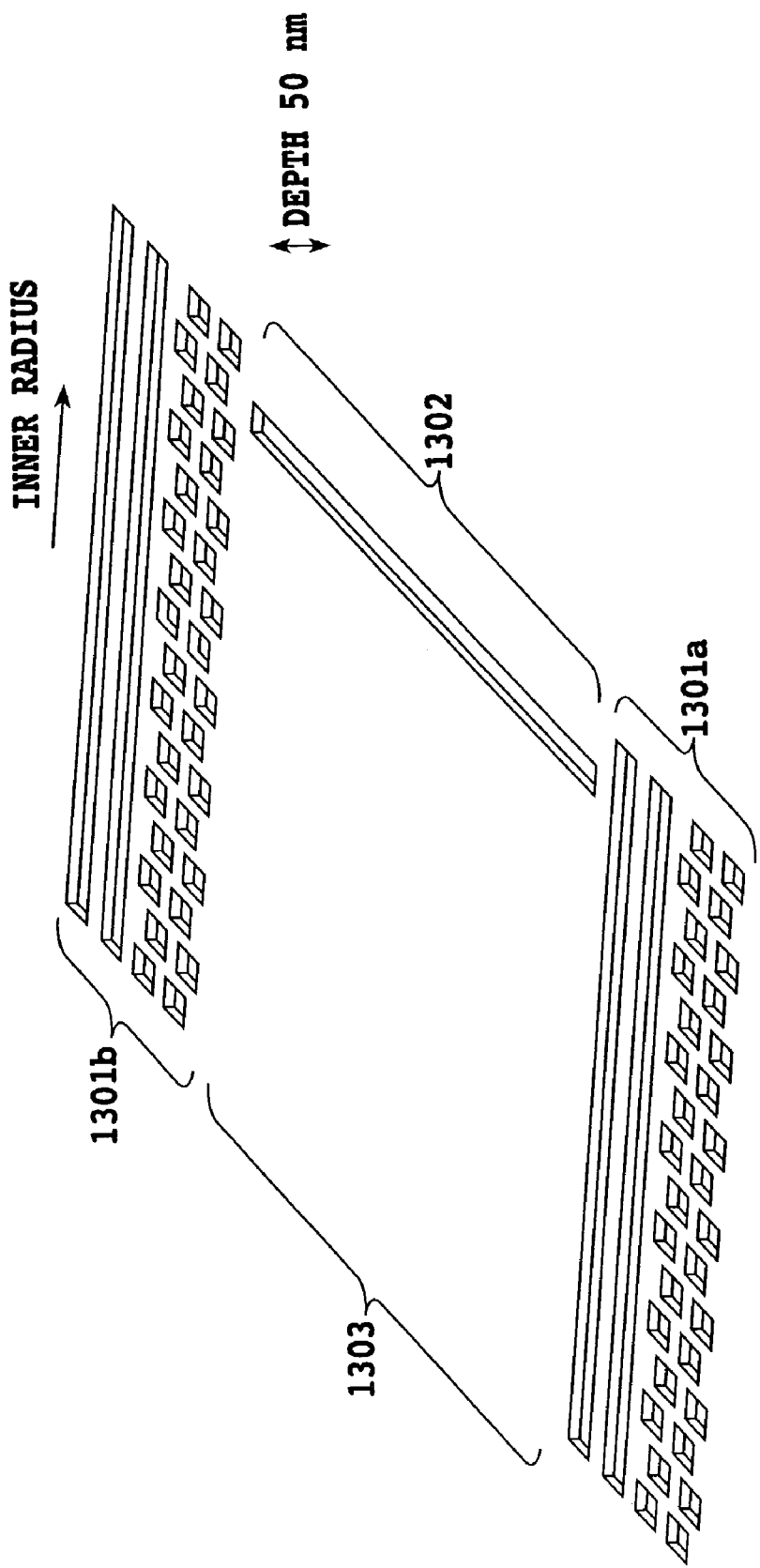
FIG. 2 is a perspective view showing an enlarged surface of the magnetic recording medium.

FIG. 2 shows an enlarged surface of the magnetic recording medium.

The individual information area 1302 is a concave portion provided at a position lower than the data area 1303 in each sector, and is provided on an arbitrary track. In the case of writing the individual information to the individual information area 1302 in the manufacturing process of the magnetic recording medium, writing is performed after the number of revolutions of the medium is lowered, the write current flowed into the magnetic head is increased and the magnetic head is located lower.

The individual information thus written can be read by an ordinary recording and regenerating unit, but its information cannot be rewritten thereby. It is because the ordinary recording and regenerating unit has a high position of the magnetic head and a small value of write current. Moreover, a writing process of the individual information needs to be performed in an on-track state during the servo operation, and so its process is performed after servo information is written to the servo areas 1301*a* and 1301*b*.

As for the individual information to be recorded on the magnetic recording medium, the information different piece by piece is written to one or more locations. Concerning the individual information, either the same information may be written to all of the individual information areas 1202*a* to 1202*e* or further different information may be written to each of the areas. Moreover, in the case of writing the digital information to the data area 1303, an ordinary writing method is used.

(Manufacturing Method)

Next, the manufacturing method of the magnetic disk medium as the magnetic recording medium will be described.

Figure 3A:
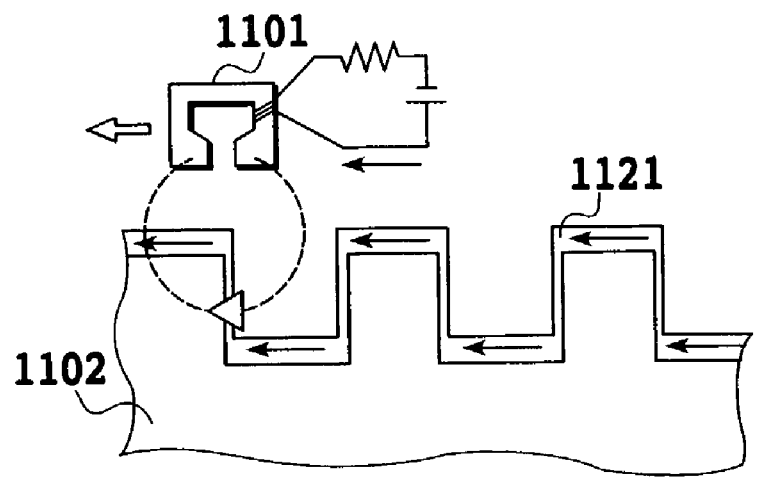
FIGS. 3A and 3B are explanatory views showing a recording method of the magnetic recording medium.
Figure 3B:
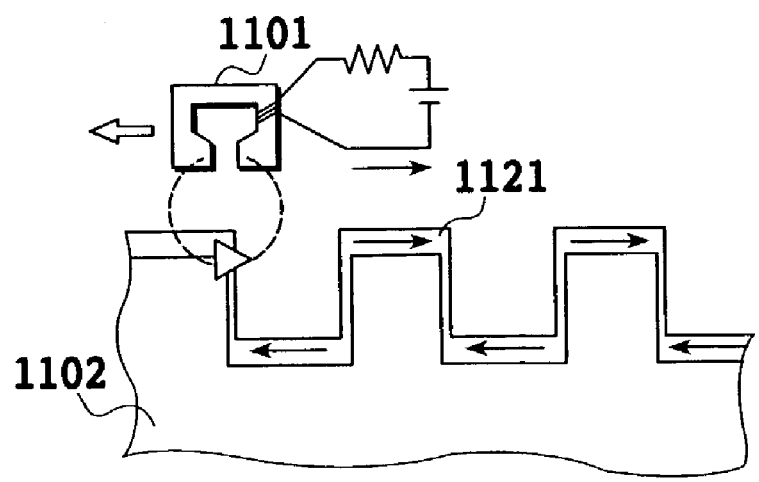

FIG. 2 shows the areas (individual information areas 1202*a* to 1202*e*) for writing the individual information seen from the entire magnetic disk medium. In order to include non-rewritable individual information to the magnetic disk medium, a concave area as shown in FIGS. 3A and 3B is created on the surface thereof. In this example, plastic is used as the substrate. That is, projections and depressions are formed on the surface of the stamper, and the plastic is made by injection-molding to create the area for writing the servo information and individual information on the surface of the plastic.

The actual manufacturing method is performed by the following procedure.

The PERM (Pre-Embossed Recording Medium) forms a convex portion at the location corresponding to the servo area and the individual information area on a metal mold for forming a plastic substrate. The servo area and the individual information area having concave and convex portions are formed on the injection-molded plastic substrate by using this metal mold. Depth of the convex portion at this time is 50 nm. The PERM is structured by laminating a ground layer, a magnetic layer and a protective in order coat on the plastic substrate by using a sputtering system, and applying a lubricant thereon.

The servo information is written on the structured PERM by the method shown in FIG. 1, that is, by recording signals of different polarities. Next, the individual information is written at the concave portion that is the individual information area in the on-track state while reading the servo information. The individual information is 16 bytes combining a creation date and a serial number.

As for the writing of the individual information, a code modulated by a PRML (Partial Response Maximum Likelihood) method is recorded at the number of revolutions of the medium 1000 rpm, write current 50 mA and frequency 80 MHz. The number of revolutions of the magnetic recording medium is lower and the write current of the magnetic head is higher than the ordinary recording-regenerating unit described later. Finally, the digital information is written in the data area by the ordinary writing method.

The ordinary recording-regenerating unit is set in a spin stand. The number of revolutions of the medium is 3600 rpm, and the write current is 25 mA. This write condition is applicable to write the data to the ordinary data area but is not applicable to the individual information area, and then the creation date and the serial number could be read. This area is being write-inhibited, but it is confirmed that this area becomes a write-error when overly overwrite and then the individual information is erased and no new data could be written. This means that this area can not be applicable to a recording area in the case of unauthorized copying of the data.

A system for implementing actual copyright protection by using the information individual to this magnetic disk medium is created.

(Information Recording Method)

Next, an information recording method for the magnetic disk medium will be described.

FIGS. 3A and 3B show sectional structures of the magnetic disk medium. The PERM can perform polarization wherein magnetizing directions are opposite relation between the tops and bottoms of the projections and depressions.

In FIG. 3A, a large amount of current is flowed into a magnetic head 101 so that both the concave and convex portions of a magnetic layer 121 of a disk 102 are magnetized in the same direction with a strong magnetic force. Next, in FIG. 3B, a small amount of current is flowed into the magnetic head 101 so that only the convex portion of the magnetic layer 121 of the disk 102 are magnetized in the opposite direction with a weak magnetic force.

Thus, it is possible to record the signals of different polarities due to differences in the distance between the magnetic head and the magnetic layer. Moreover, it is also possible to record those signals with a varied magnetic force by changing the number of revolutions of the medium and the write current of the magnetic head.

The PERM utilizes the projection and depression corresponding to magnetic inversion as a servo signal. Since positional accuracy of the projection and depression is higher than positional detection by the writing of the conventional servo signal, the PERM can improve a recording density.

As described above, in the manufacturing process of the magnetic recording medium, the individual information different piece by piece is recorded in advance. This individual information is used as a part of the key for unprotecting the encryption and so on. As for the magnetic recording medium, for instance, the PERM (Pre-Embossed Recording Medium), which is the disk having the projection and depression corresponding to the magnetic inversion of a recording information signal on the surface of the medium, is used and the individual information in a specific area of the PERM is recorded. The individual information can be read by the ordinary recording-regenerating unit but cannot be rewritten thereby.

Thus, even if the digital information is copied to different magnetic recording media, the individual information cannot be rewritten, and the digital information cannot be regenerated. In addition, it can prevent unauthorized action by interpolating the individual information. For example, image information of a computer program, video and so on can be protected.

SECOND EXAMPLE

A second embodiment of the present invention will be described based on FIGS. 4 to 7.

This example is corresponding to claims 14 to 25, and relates to the copyright management system, information process unit and information process method.

Hereafter, it will be described by taking complete examples.

(Information Recording Medium)

Figure 4:
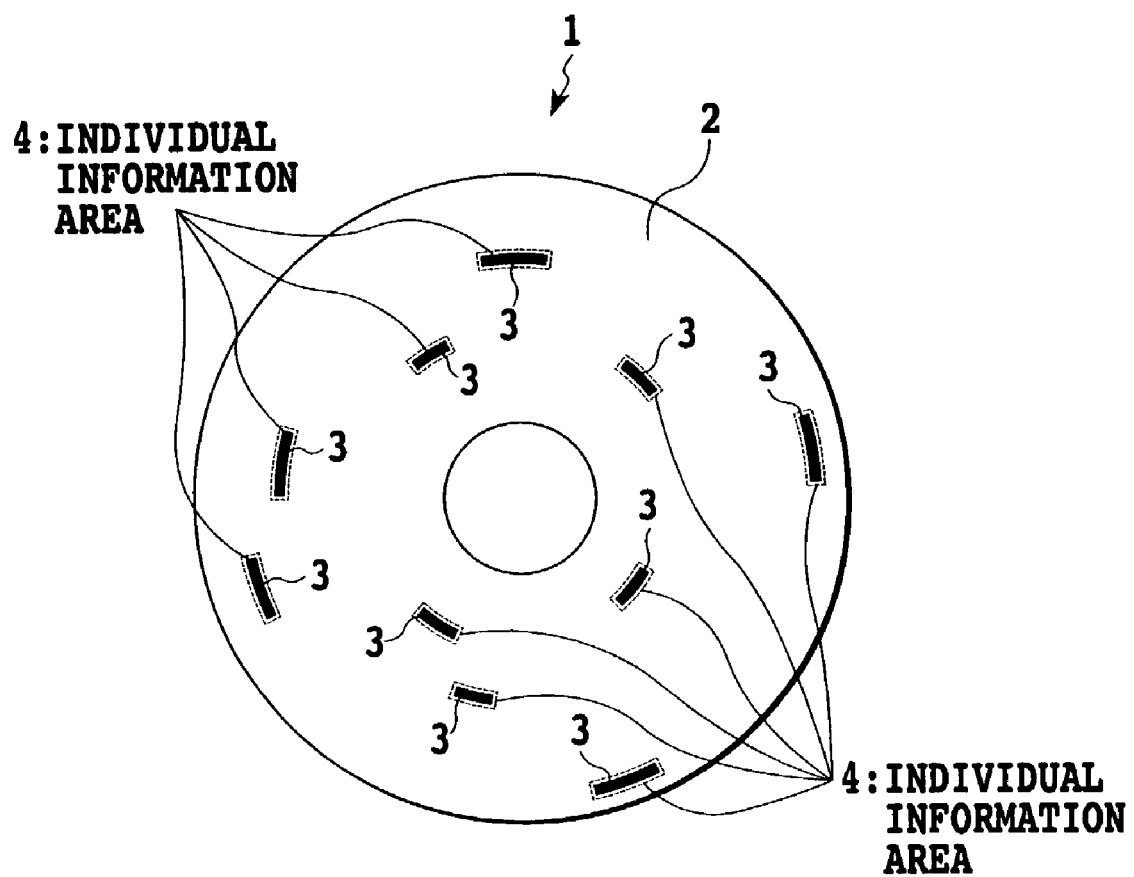
FIG. 4 is a plan view showing a substrate form of an information recording medium according to a second embodiment of the present invention.

FIG. 4 shows a configuration example of the information recording medium related to the present invention. A magnetic recording medium 1 will be described as an example of the information recording medium here, and moreover, recording medium using light and so on can be applicable as storing means.

In a fixed information area 4 in which media individual information 3 on a plastic substrate 2 constituting the magnetic recording medium 1 is formed, the media individual information 3 is formed in a concave shape at least at one or more locations. This media individual information 3 is comprised of a individual number or data for identifying the medium.

After thus creating the media individual information 3 on the plastic substrate 2, the magnetic layer and protective coat are laminated in order. After finally performing a servo write, sequential numbers of the magnetic recording medium 1 and a decode program to be transferred to a decoder are written as individual data on condition of operating the servo in a state of low revolution and a maximum write current. And the above structured magnetic recording medium 1 is installed in a digital AV process unit 100 as shown in FIG. 5 described below, and a test is performed.

(Copyright Management System)

Figure 5:
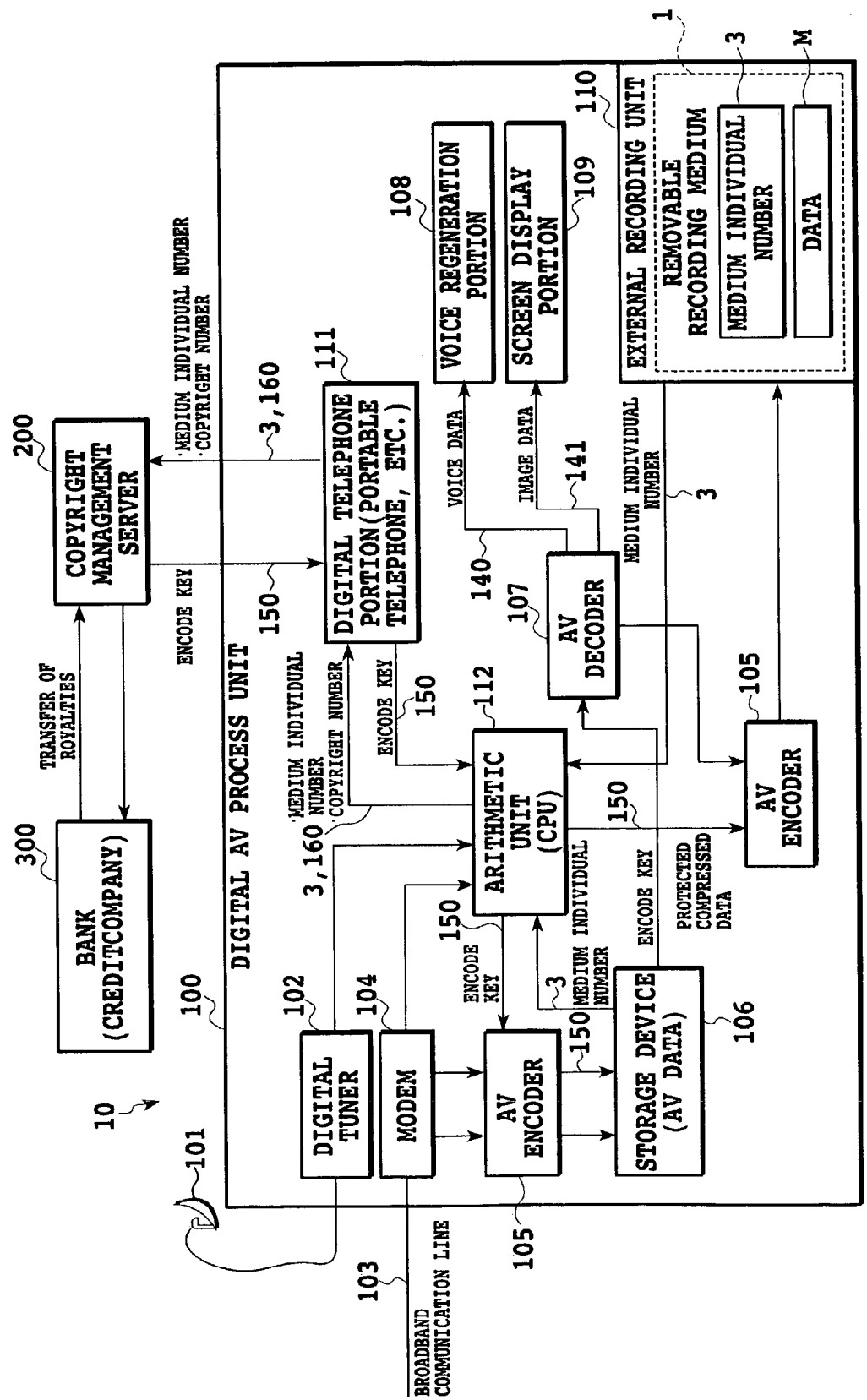
FIG. 5 is a block diagram showing a configuration of a copyright management system.

FIG. 5 shows a configuration example of the copyright management system related to the present invention.

A copyright management system 10 is divided into the digital AV process unit 100 as an information process unit capable of incorporating the above mentioned magnetic recording medium 1 and a copyright management server 200. The copyright management server 200 is connected to a bank 300 (credit company) as a financial institution in order to make payments of royalties and so on.

Hereafter, the configurations of the portions of the system will be described.

<System Configuration>

The AV process unit 100 shown in FIG. 5 will be described.

The AV process unit 100 is equipped with an antenna 101 and a tuner 102 for a satellite broadcast capable of receiving a digital broadcast, and a modem 104 having a modulating and demodulating function for receiving in the information from a broadband communication line 103, and so on.

In addition, it has an AV encoder 105 for encoding communication information and various kinds of information from the antenna 101 and broadband communication line 103, a storage device 106 (magnetic recording medium or the like) for storing the communication information, an AV decoder 107 for converting the digital information into an actual image, a voice regenerating portion 108 for displaying voice data 140 and image data 141, and a screen display portion 109.

Furthermore, it is equipped with an external recording unit 110 for storing data as data of one's own from a storage device 106 for storing temporary information, a digital telephone portion 111 for performing authentication to the outside in order to have the copyright protected, and an arithmetic unit 112 for performing a process of controlling the entire unit and a process related to the present invention.

The external recording unit 110 can have the aforementioned removable recording medium 1 in FIG. 4 removably mounted. A medium individual number as the media individual information 3 is recorded on the removable recording medium 1.

(Characteristic Configuration Related to the Present Invention)

Figure 6:
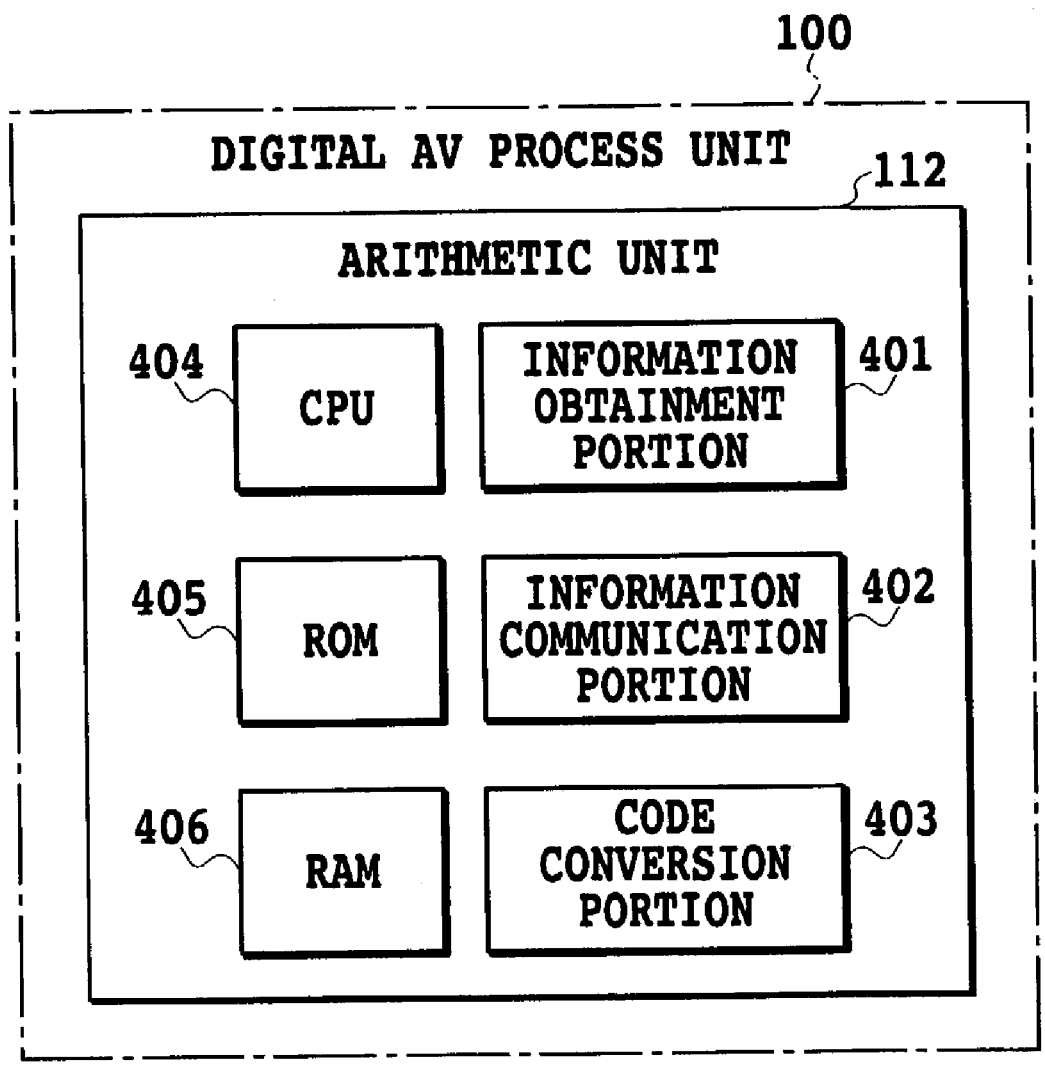
FIG. 6 is a block diagram showing the configuration of a digital AV process unit included in a system in FIG. 2.

FIG. 6 shows a characteristic configuration provided to the AV process unit 100.

The arithmetic unit 112 of the AV process unit 100 includes an information obtaining portion 401, an information communicating portion 402 and a code conversion portion 403. Furthermore, the unit 100 also includes a CPU 404 for performing centralized control, an ROM 405 for storing a control program and so on, and an RAM 406 utilized for various calculation processes and as a temporary memory.

The information obtainment portion 401 has a function of obtaining the medium individual number 3 of the removable recording medium 1.

The information communication portion 402 has a function of transmitting the obtained medium individual number 3 to the copyright management server 200 and a function of receiving an encode key 150 as a management key from the copyright management server 200.

The code conversion portion 403 has a function of encoding the digital information as predetermined information to create encode data, when recording various kinds of received information and using the encode key 150 as the management key, and the portion 403 has a function of decoding the encode data recorded on the removable recording medium 1 to create decode data, when reproducing various kinds of information and using the encode key 150 as the management key.

In addition, the code conversion portion 403 may also include a function of writing the data from the writing onward by encoding its data as a scramble code according to the medium individual number 3, in the case of writing astride the individual information area 4 when recording the digital information on the removable recording medium 1, and the portion 403 may include a function of regenerating the data from the detection onward while descrambling its data according to the medium individual number 3, in the case of detecting the individual information area 4 when regenerating the digital information on the removable recording medium 1.

Furthermore, the code conversion portion 403 may also include a program for performing an encoding or decoding process concerning the data included in the medium individual number 3 of the removable recording medium 1.

Furthermore, the code conversion portion 403 may also include encode or decode the information according to interrupt processing when recording or regenerating the digital information and using the medium individual number 3 of the removable recording medium 1.

Figure 7:
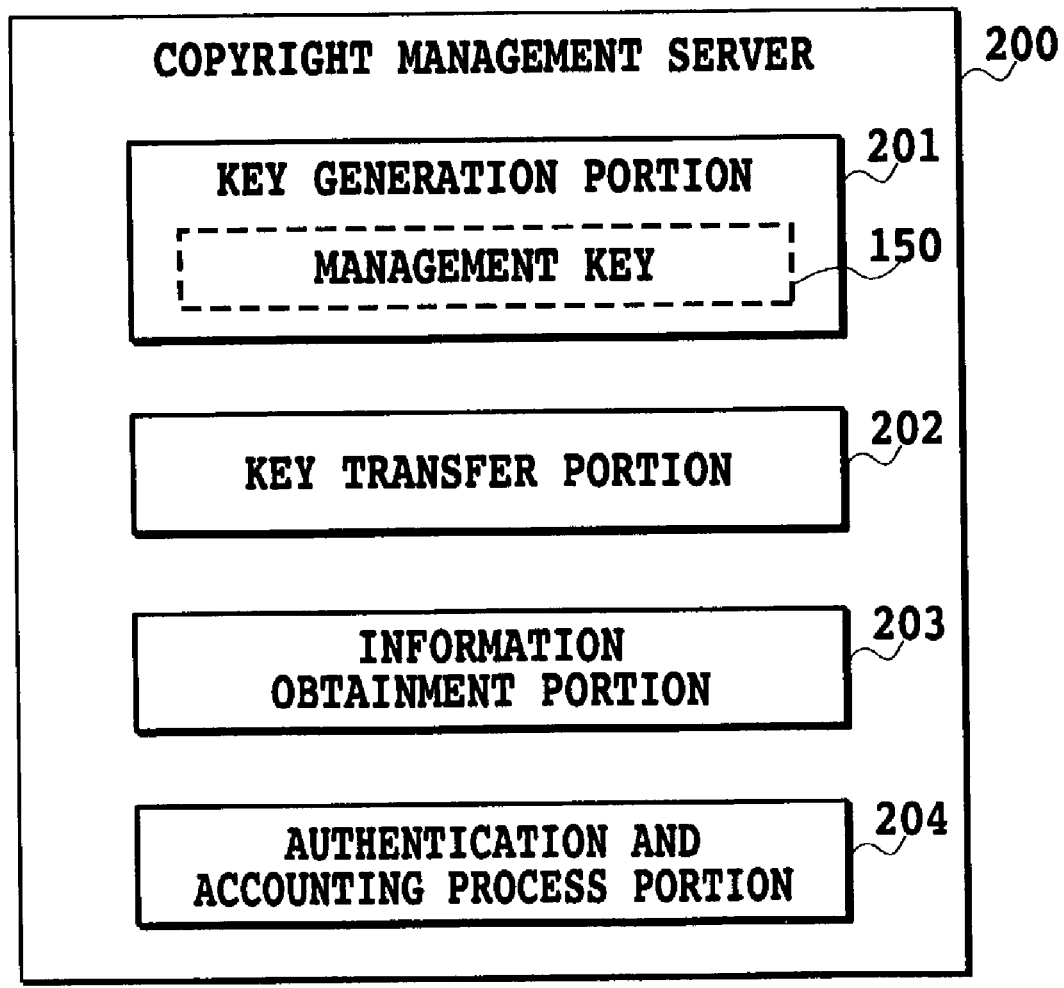
FIG. 7 is a block diagram showing the configuration of a copyright management server included in the system in FIG. 2.

FIG. 7 shows the characteristic configuration provided with the copyright management server 200.

The copyright management server 200 includes a key generation portion 201, a key transfer portion 202, an information obtainment portion 203 and an authentication and accounting process portion 204.

The key generation portion 201 has a function of generating the encode key 150 as the management key used for recording or regenerating on the removable recording medium 1 according to the transferred medium individual number 3.

The key transfer portion 202 has a function of transferring the generated encode key 150 to the digital AV process unit 100.

The information obtainment portion 203 has a function of obtaining the medium individual number 3 and a copyright number 160 from the removable recording medium 1 via the digital AV process unit 100.

The authentication and accounting process portion 204 has a function of performing authentication and accounting processes of the removable recording medium 1, when generating the encode key 150 and communicating with the bank 300 which is the financial institution.

<System Operation>

Next, the operation of this system will be described.

As for the digital AV process unit 100, the storage device 106 for temporarily accumulating the data (i.e. digital information as communication information) has the data overwritten at any time, and the copyright is not being strictly protected in this case. However, in the case of memorizing the information as the personal data, it is necessary a mechanism for protecting the data from an illegal copy.

Thus, the medium individual number 3 of the removable recording medium 1 is read by the external recording unit 110 and this number 3 is taken into the arithmetic unit 112 to perform a predetermined process, and then the processed data is transferred to the copyright management server 200 as an external authentication agency together with the copyright number 160.

The copyright management server 200 collates the transferred data with the code showing the copyright to be actually copied, and performs a charge payment process to the bank 300 and produces the encode key 150 as the management key for encoding, and then returns the encode key 150 to the digital AV process unit 100.

The digital AV process unit 100 encodes the digital AV data as the received digital information into the data individual to the medium again by using the encode key 150, and thus creates the encode data. Thereafter, the encode data is recorded on the removable recording medium 1 mounted the external recording unit 110.

The recorded digital AV data on the removable recording medium 1 can be converted into the voice and the image data so as to be visible as well as audible for a person via the voice regenerating portion 108 and the screen display portion 109 by decoding its data through the AV decoder 107.

As described above, this system adds one or more individual numbers to each recording medium and makes the medium non-rewritable on an ordinary drive to create an environment in which there is no same recording medium in the world. By using these individual numbers, it is possible to create the copyright protection environment so as not to be regenerated the data even if simple data copying is performed.

This protection is a technique that the individual number is a part of the unprotect key and thus unprotection process cannot be performed because the unprotect key is different, even if the digital data of another medium is copied. That is, in a copy process, it is necessary to generate the scramble according to the information recording medium by any means, and then the illegal copy process can be eliminated so that a system that the royalties are collected when the scramble is generated is constructed.

The act of copying is consciously performed by a person, and thus a system, that the royalties must be paid when copying and digital AV information is regarded as one's own data while performing the scramble process, is considered as a rational structure.

In addition, in the case where one or more different individual numbers are added to each information recording medium and the recording and regeneration are performed astride the data, it is asynchronous interrupt process inside the drive when performing a process of changing the scramble code, and thus a system for eliminating the illegal copy by software on the computer can be created.

In this system, it is different on each drive whether the digital AV information is written at physical position of the information recording medium according to usage way of the information recording medium. Thus, for example, the scramble process is performed by using the key that combines a frame number of the image and the individual number of the information recording medium, and then each medium memorizes different data piece by piece. Therefore, each medium is copied in itself, the copyrighted digital AV information is not correctly regenerated. However, in the case of regenerating the information recording medium that is a formal copy version, the medium is correctly regenerated.

CONCRETE EXAMPLE

Next, it will be described by taking a concrete example.

A concrete encoding/decoding process is the following method. First, the medium individual number 3 of the removable recording medium 1 is 61, 53, 2753, and these data are transferred to the copyright management server 200 via the digital AV process unit 100. 61, 53 are arbitrary prime numbers, and 2753 is an adequate random number.

The copyright management server 200 calculates n=61*53=3233 and φ(n)=(61−1)*(53−1)=3120 based on those data. Furthermore, it calculates d that makes (2753*d) mod φ(n)=1.

In the case of calculating the value d, 3120 should be multiplied by arbitrary natural numbers and a natural number having a remainder of 1 when divided by 2753 should be found, and thus d is calculated by using the natural number. Here, on the assumption of d=17, and this value as the management key (encode key) is transferred to the digital AV process unit 100.

In the case of encoding of the data on the removable recording medium 1, the calculation of n=61*53=3233 is performed by using 61, 53 as the medium individual number 3 of the removable recording medium 1, and the calculation of F=(M^d) mod n is performed for data M and is recorded by using the management key d transferred from the copyright management server 200. If M=123 is used as the data, it makes (123^17) mod 3233=855, and this calculated value is recorded on the removable recording medium 1.

In the case of regenerating the above recorded data on the removable recording medium 1, the calculation should be performed by using the medium individual number 3 without fail, thereby protecting the copyright. To be more specific, by using 2753 of the medium individual number 3, the following formula:

$$(855^{2753}) \bmod 3233 = 123$$

is calculated to obtain the original data 123.

On the other hand, if another removable recording medium 1 is used as a copy destination medium so as to perform an illegal copy, the medium individual number 3 becomes different, and then the encode key 150 is also different when performing the above-mentioned calculation process.

Therefore, even if the regeneration is performed by using the different encode key 150, the information cannot be correctly regenerated from the removable recording medium 1 that is a recording source. If this illegal copy tries to be concretely calculated, it is (123^2753) mod 3233=2746, and then the conversion for obtaining correct AV information can not be performed, thereby being invisible and inaudible.

In addition, in the above system, by collecting the copyright number 160 at the same time when copying, it is possible to obtain a system capable of allowing a copy to be needed while protecting from an illegal copy.

Furthermore, it becomes possible to protect the copyright more strictly by providing a plurality of individual information areas 4 of an information recording medium 1. In this case, if an attempt is made to copy the digital AV data astride the individual information areas 4, the external recording unit 110 designates a new medium individual number 150 to the arithmetic unit 112 as an interrupt process. At this time, the arithmetic unit 112 obtains a new encode key by calling the copyright management server 200 again and then another encode data is made by using the key. Thus, it becomes possible to add the protection of a plurality of patterns to one piece of digital AV data, thereby more strictly copyright protection.

As described above by taking the concrete examples, each information recording medium for recording has the information including a different individual number, and then even if the same data of the digital broadcast or the like is transferred, all of the data is recorded as different type of data when copying and storing the content, thereby creating a system so as not to permit an illegal copy. To copy the digital AV information according to the information recording medium piece by piece, the information must be converted into the data capable of descrambling. When connecting the information, a system for collecting the royalties is structured to protect the copyright.

Moreover, while a function shown in FIG. 4 of creating the encode key 150 as the management key is provided on the copyright management server 200 side that is a separate body from the digital AV process unit 100 in this example, it is not limited thereto but may be integrally provided in the digital AV process unit 100.

THIRD EXAMPLE

A third embodiment of the present invention will be described based on FIGS. 8 to 13. Moreover, the same portions as the aforementioned second example are numbered likewise omitting the description thereof.

This example is a deformed example of the second example, and is corresponding to claims 14 to 25 related to the copyright management system, information process unit and information process method.

Hereafter, it will be described by taking concrete examples.

While the encryption technique in the prior art particularly aim at keeping a secret between a person and others, the copyright protection needs to keep the copyright information secret to the person (person performing hacking), and so this needs to be solved.

Thus, in this example, the embodiment of presenting the function for the encryption and decryption for the sake of strengthening the copyright protection will be described.

<System Structure>

Figure 8:
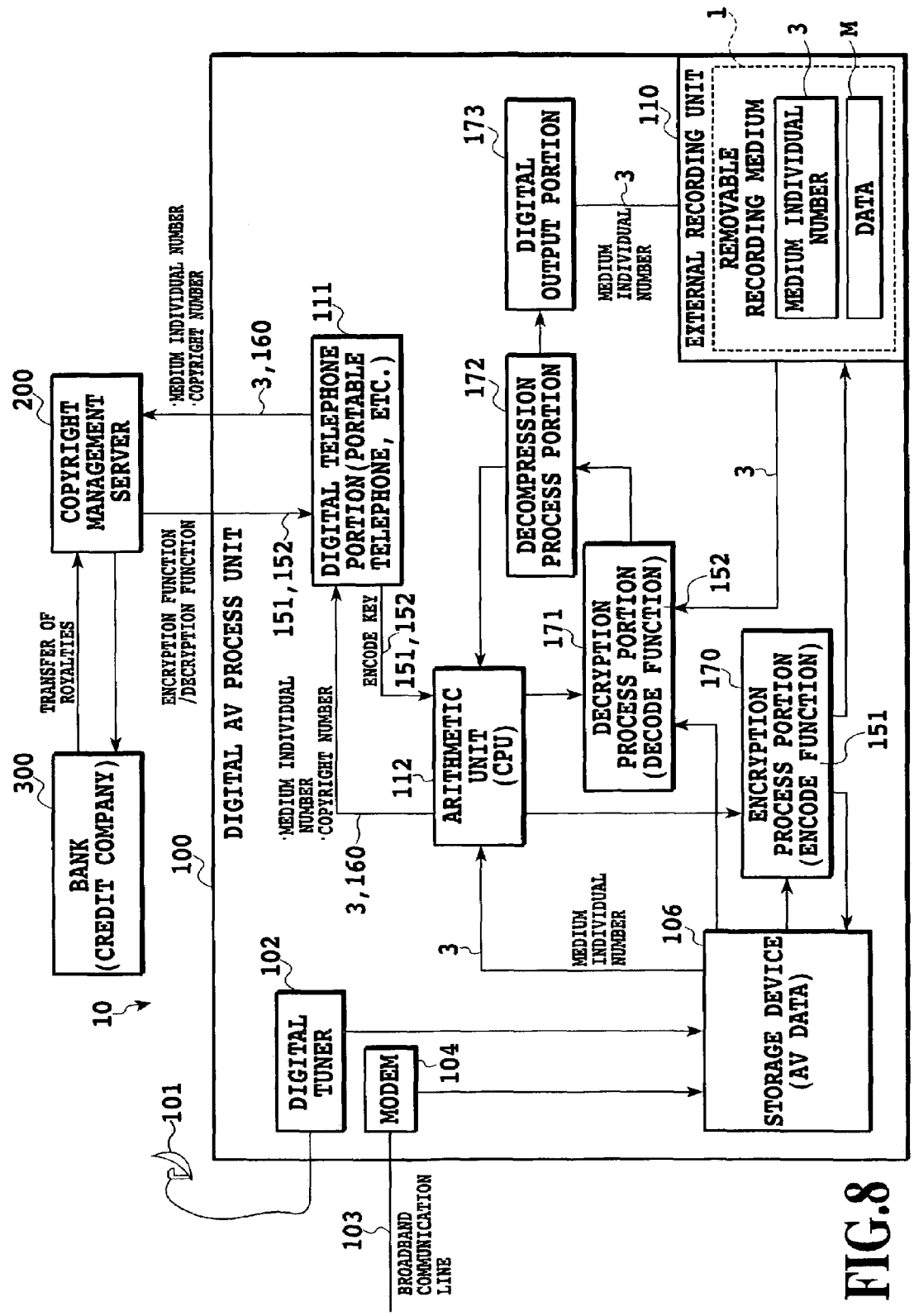
FIG. 8 is a block diagram showing a configuration of a copyright management system according to a third embodiment of the present invention.

FIG. 8 shows a structure example of the copyright protection system according to this embodiment.

In this system, the digital AV process unit 100 includes an encryption process portion 170, a decryption process portion 171, a decompression process portion 172 and a digital output portion 173. The encryption process portion 170 and decryption process portion 171 handle encrypted data.

The copyright management server 200 generates the management key corresponding to the medium individual number 3 as the medium individual information, and the management key 150 includes an encode function 151 or a decode function 152.

In the digital AV process unit 100, the encryption process portion 170 performs an encode process of the communication information by using the encode function 151 included in the management key 150. The decryption process portion 171 performs a decode process of the encode data by using the decode function 152 included in the management key 150.

In this case, the encode function 151 or decode function 152 included in the management key 150 transferred from the copyright management server 200 is an immature function, and this function and the medium individual number 3 are calculated to create the encode function 151 or the decode function 152 used for a completed real process.

In addition, in an arithmetic process for the encode function used for the calculation in the encryption process portion 170 and the decode function used for the calculation in the decryption process portion 171, each element of multiplication of the matrix regards a remainder of a predetermined prime number as a solution.

The decompression process portion 172 has a function of converting the digital AV information into an actual image. The digital output portion 173 has a function of outputting the image and the voice to television and so on. The other configurations are the same as FIG. 4, and description thereof will be omitted here.

<System Operation>

Next, operation of this system will be described.

Figure 9:
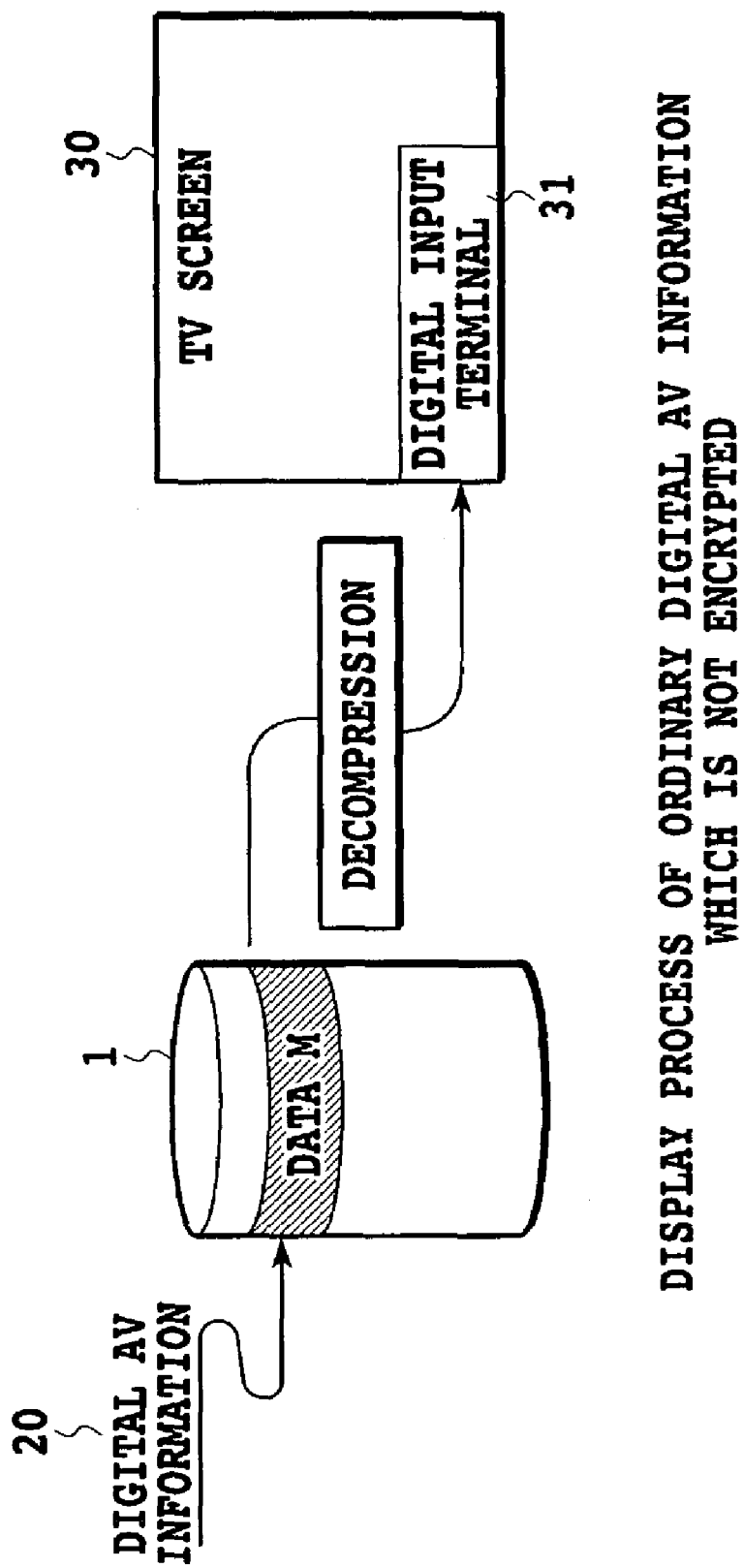
FIG. 9 is an explanatory view showing a display process of ordinary digital AV information which is not encrypted.

FIG. 9 explains the display process of the digital AV information 20 that is not being encrypted.

The digital AV information 20 obtained from the digital broadcast or broadband is normally compressed, and the information 20 is only decompressed to directly output it to a digital input terminal 31 of television 30 and so on.

(Display Process)

Next, an example of the display process for displaying the encrypted digital AV information related to the present invention will be described based on FIGS. 10 to 13.

Figure 10:
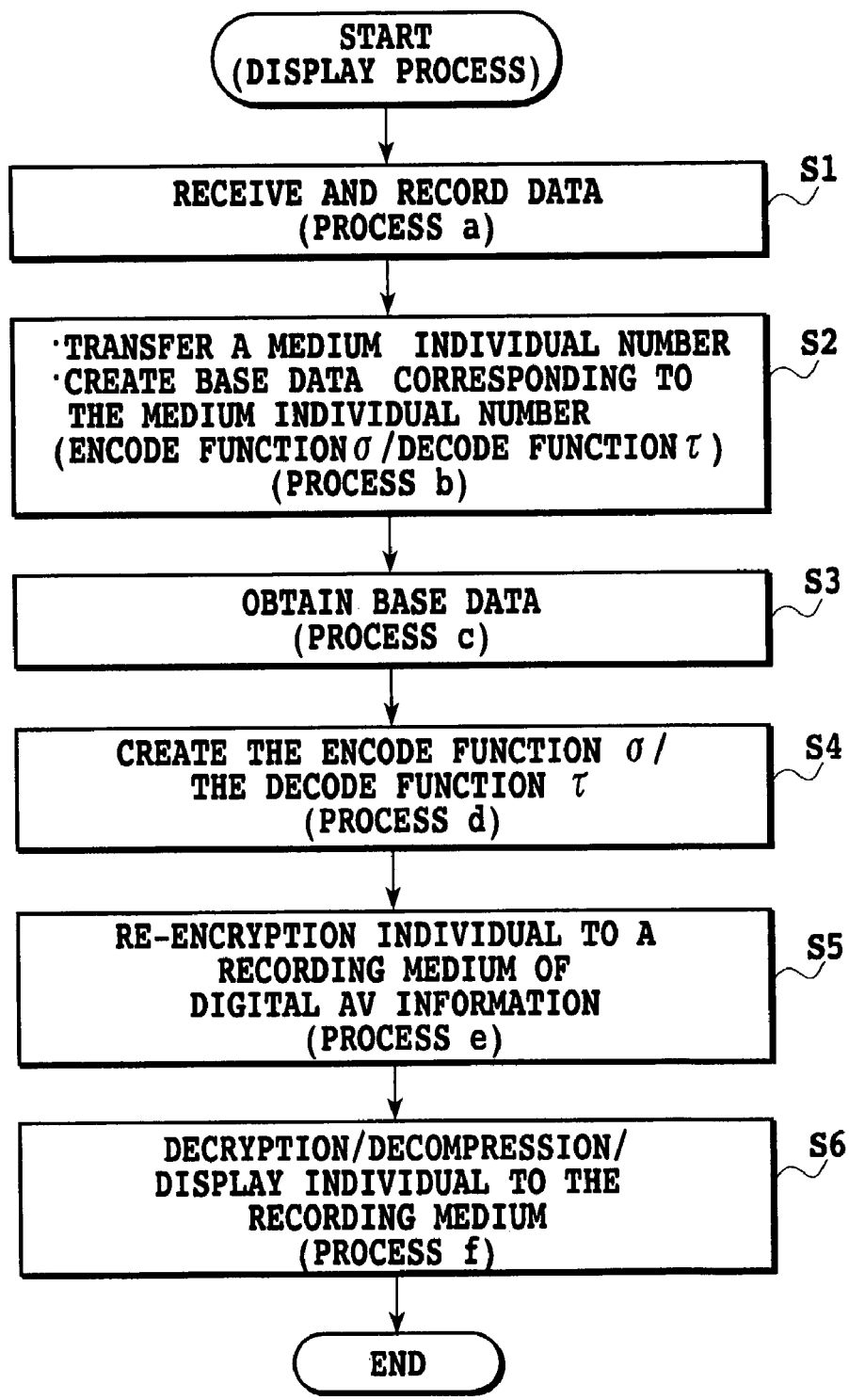
FIG. 10 is a flowchart showing an example of the display process.

FIG. 10 is a flowchart of the display process (processing steps a to f) shown in FIGS. 11A to 13.

In FIGS. 11A and 11B, the digital AV information 20 as a source is encrypted by an encryption function ρ at a data outgoing side, and is transmitted as C1. At this time, it is necessary to simultaneously send at least a header indicating that it is being encrypted and the data of a contact (an access method to the copyright management server 200 such as a telephone number) to be informed in the case of decrypting the cipher.

In a step S1, as shown in a process A in FIG. 11A, encrypted data C1 is recorded on the storage device 106 in real time.

The digital AV information 20 can be seen after decrypting based on a process B onward.

In a step S2, as shown in the process B in FIG. 11B, the medium individual number 3 is transferred to the copyright management server 200. At this time, the copyright protection further becomes secure when the medium individual number 3 is encrypted and transferred so as to be unknown. In the case of separately charging when seeing the information 20, a fee can be collected here.

The copyright management server 200 generates an encryption function σ and a decryption function τ as the management keys corresponding to the medium individual number 3. As for generation of these functions, it is secure as long as the medium individual number 3 is unknown and then the encryption function key is also unknown, even if simple calculation is used, such as performing X-OR (Exclusive-OR) with the key used for the encryption function or performing subtraction by using the medium individual number 3.

In a step S3, as shown in a process C in FIG. 11B, the digital AV process unit 100 obtains a database 40 of the encryption function σ and decryption function τ transferred from the copyright management server 200.

Figure 12B:
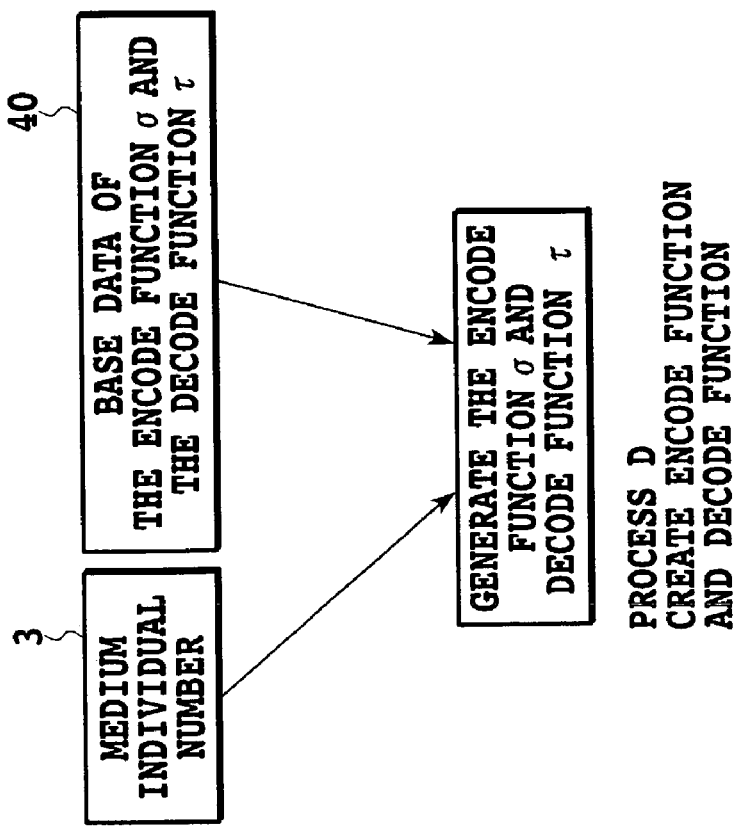
FIGS. 12A and 12B are explanatory views showing the display process of the digital AV information which is encrypted following FIGS. 11A and 11B.
Figure 12A:
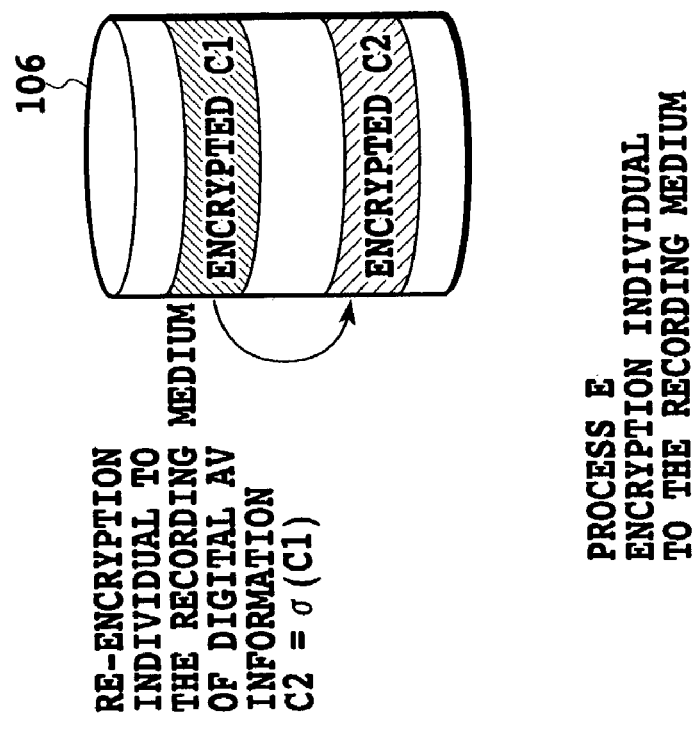

In a step S4, as shown in a process D in FIG. 12A, the encryption function σ and decryption function τ to be actually used are induced from the database 40 of the encryption function σ as well as the decryption function τ sent from the copyright management server 200 and from the medium individual number 3. In this case, the original encryption function ρ, the encryption function σ individual to the recording medium, and the decryption function τ need to be $\rho \times \sigma \times \tau = 1$.

In a step S5, as shown in a process E in FIG. 12B, the encrypted data C1 as the received data is converted into the encrypted data C2 again by using the created encryption function σ and the connected data C2 is recorded. If the encrypted data C2 is completed, C1 is no longer necessary and then C1 may be deleted.

Figure 13:
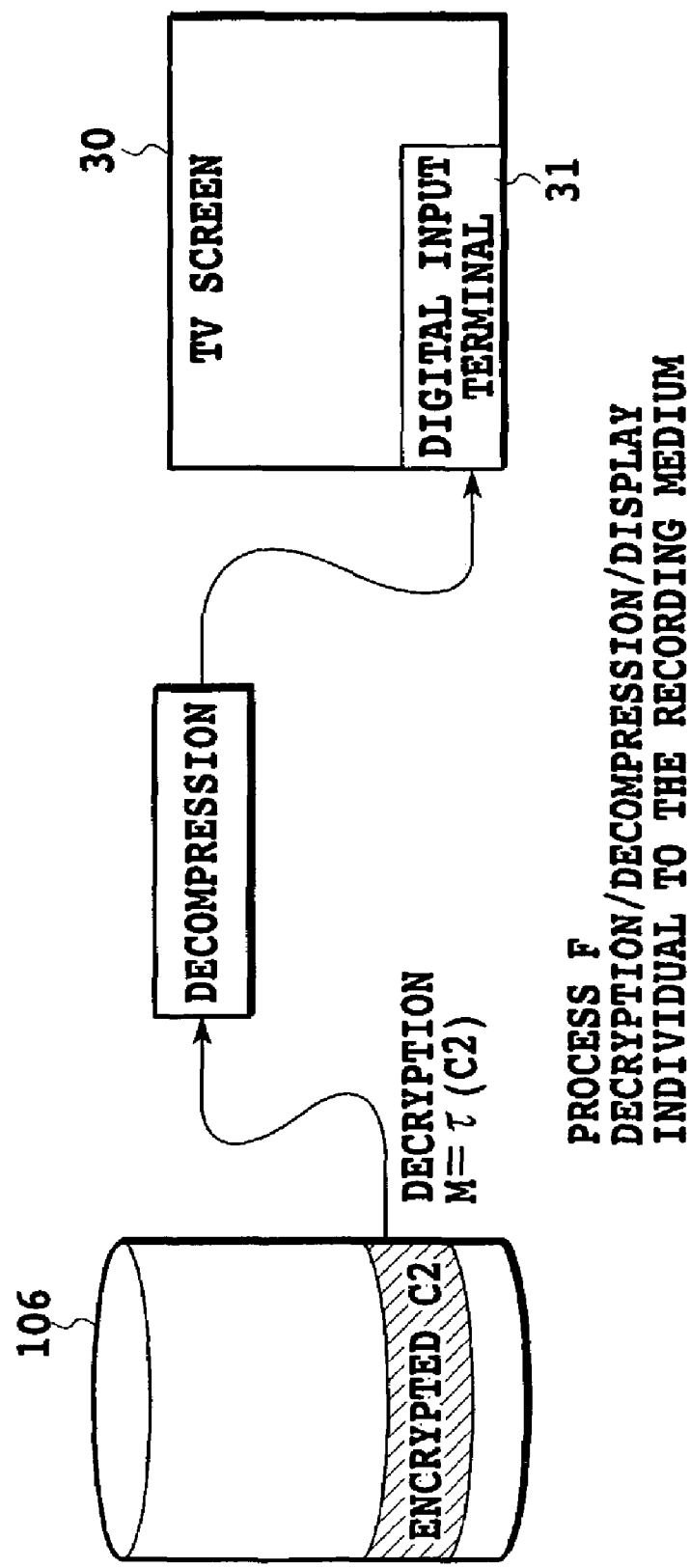
FIG. 13 is an explanatory view showing the display process of the digital AV information which is encrypted following FIGS. 12A and 12B.

Finally, in a step S6, as shown in a process F in FIG. 13, in the case of seeing the encrypted data C1 that was re-encrypted and recorded, the C2 is decrypted first by using the decryption function τ. Thus, the encrypted and recorded information is decoded into M that is the original digital AV information.

Thereafter, it is possible to output the decoded data to a digital input terminal of the television or the like by performing the same decompression as that for the ordinary non-encrypted digital AV information.

As described above, this system attaches one or more pieces of the information or data including a different medium individual number 3 to each of the recording medium as well as normally non-rewritable to create the environment in which there is no same recording medium in the world. The encryption individual to the recording medium becomes possible by using the information or data including the medium individual number 3. Therefore, the copyright protection, in which another recording medium can not be regenerated even if the digital data is simply copied, can be provided.

This protection technique is impossible to protection-release because the decryption function is different even if the digital data of another medium is copied, by using the information or data including the medium individual number 3 as a part of the encryption function and decryption function. That is, in the case of copying the digital AV data, it is necessary to generate the encryption function and decryption function in accordance with the recording medium by any means. Therefore, a system that the royalties are collected if necessary is structured when generating the encryption function and the decryption function, an illegal copy can be eliminated.

As the act of copying is consciously performed by a person, a system, in which the royalties are collected if necessary when copying to use the digital AV information as the data of one's own, is rational compared to a system in which a copy performs without limits when purchasing the conventional digital AV information, because detailed setting of fees is possible.

CONCRETE EXAMPLE

Next, it will be described by taking a concrete example.

The processing steps a to f will be described by using a concrete medium individual number 3, an encryption function 151 and a decryption function 152. Here, it will be described by regarding the medium individual number 3 as "217."

$$\text{Original information } M = \begin{pmatrix} 56 \\ 92 \end{pmatrix} \text{ and} \qquad \text{[Equation 1]}$$

$$\text{Function } \rho = \begin{pmatrix} 39, & 187 \\ 215, & 93 \end{pmatrix} \sigma = \begin{pmatrix} 38, & 129 \\ 223, & 194 \end{pmatrix}$$

$$\tau = \begin{pmatrix} 80, & 53 \\ 173, & 114 \end{pmatrix}$$

And a common number N=257 is prepared, and ρ(M)=ρ×M mod N is defined as a calculation rule. Moreover, as for an element 38 of the function σ, 38=not (256) is used by employing 217 as the medium individual number.

Thus, it becomes as follows.

$$C1 = \rho * M \mod N = \begin{pmatrix} 39, & 187 \\ 215, & 93 \end{pmatrix} * \begin{pmatrix} 56 \\ 92 \end{pmatrix} = \begin{pmatrix} 113 \\ 36 \end{pmatrix}$$

C1 is distributed as the encrypted digital AV information 20.

Next, 170 as the medium individual number is transferred to the copyright management server 200. The copyright management server 200 performs X-OR between the medium individual number 170 and the functions including the encode function σ and the decode function τ, and informs the digital AV process unit 100. The encode function σ' and decode function τ' to be transferred are as follows.

$$\sigma' = \begin{pmatrix} 255, & 88 \\ 6, & 27 \end{pmatrix} \tau' = \begin{pmatrix} 138, & 236 \\ 116, & 171 \end{pmatrix}$$

Inside the digital AV process unit 100, the transferred encode function σ' and decode function τ' are reconverted to the original functions σ and τ by performing X-OR with 217 as the medium individual number.

Next, in re-encryption process individual to the medium, the once recorded C1 is processed by using the encode function to calculate C2=σ(C1)=σ×C1 mod N.

$$C2 = \begin{pmatrix} 38, & 129 \\ 223, & 194 \end{pmatrix} * \begin{pmatrix} 113 \\ 36 \end{pmatrix} \mod 257 = \begin{pmatrix} 200 \\ 58 \end{pmatrix}$$

Thus, the re-encrypted digital AV information 20 is recorded on the recording medium. In the case of regenerating the recorded information, it is reconverted into the original information M by using the decode function τ.

$$M = \tau(C2) = \tau * C2 \mod N$$

$$M = \begin{pmatrix} 80, & 53 \\ 173, & 114 \end{pmatrix} * \begin{pmatrix} 200 \\ 58 \end{pmatrix} \mod 257 = \begin{pmatrix} 56 \\ 92 \end{pmatrix}$$

After recovering, the original information M is only decompressed and is displayed on the screen.

(Illegal Copy)

Because the encryption function σ or the decryption function τ is created corresponding to the medium individual number of the removable recording medium 1, the function becomes another function if the removable recording medium 1 is different. As a result, the correct original information M cannot be created even if the data of the different removable recording medium 1 is copied.

As described above by taking concrete examples, each removable recording medium has the information or data including a different medium individual number 3, and then even if the same digital AV information 20 such as the digital broadcast is transferred, all of the data is recorded as different type of the data when memorizing the content. Therefore, it is secure for the copyright protection.

In addition, in the case of copying, the recorded content becomes the encrypted digital AV information 20 corresponding to the information or data including the medium individual number 3 of the copying destination medium, thereby creating a system so as not to an illegal copy. In order to copy the recorded content as the digital AV information 20 according to each removable recording medium 1, its content needs to be converted into the data capable of decryption. This conversion becomes possible by using a different place (i.e. the copyright management server 200 or the like), connecting to the server through a digital line and so on, and being informed of the encryption function and the decryption function according to the medium individual number. In addition, when performing this conversion, a system for collecting the royalties if necessary is structured, thereby protecting the copyright.

Furthermore, by changing the process depending on whether only to see the digital AV information 20 or to copy, the detailed setting of the fees is possible such as differentiating the fee only for seeing the digital AV information 20 and the fee for copying its information.

FOURTH EXAMPLE

Next, a fourth embodiment of the present invention will be described by referring to FIGS. 14 to 19B. Moreover, the same portions as the aforementioned examples will be given the same symbols, and the description thereof will be omitted.

This example is a deformed example of the third embodiment, and is corresponding to claims 14 to 25, related to the copyright management system and information process unit and method. Moreover, the system structure is the same as that of FIG. 8 previously mentioned.

Hereafter, it will be described by taking a concrete example.

Here, in the encryption process portion 170 of FIG. 8, the encrypted encode data is re-corded on the removable recording medium 1 when performing the process using the encode function.

(Display Process)

Next, an example of the display process for displaying the encrypted digital AV information related to the present invention will be described based on FIGS. 14 to 17B.

To store the digital AV information 20, the copying process to the removable recording medium 1 and the display process therefrom will be described for instance.

Figure 14:
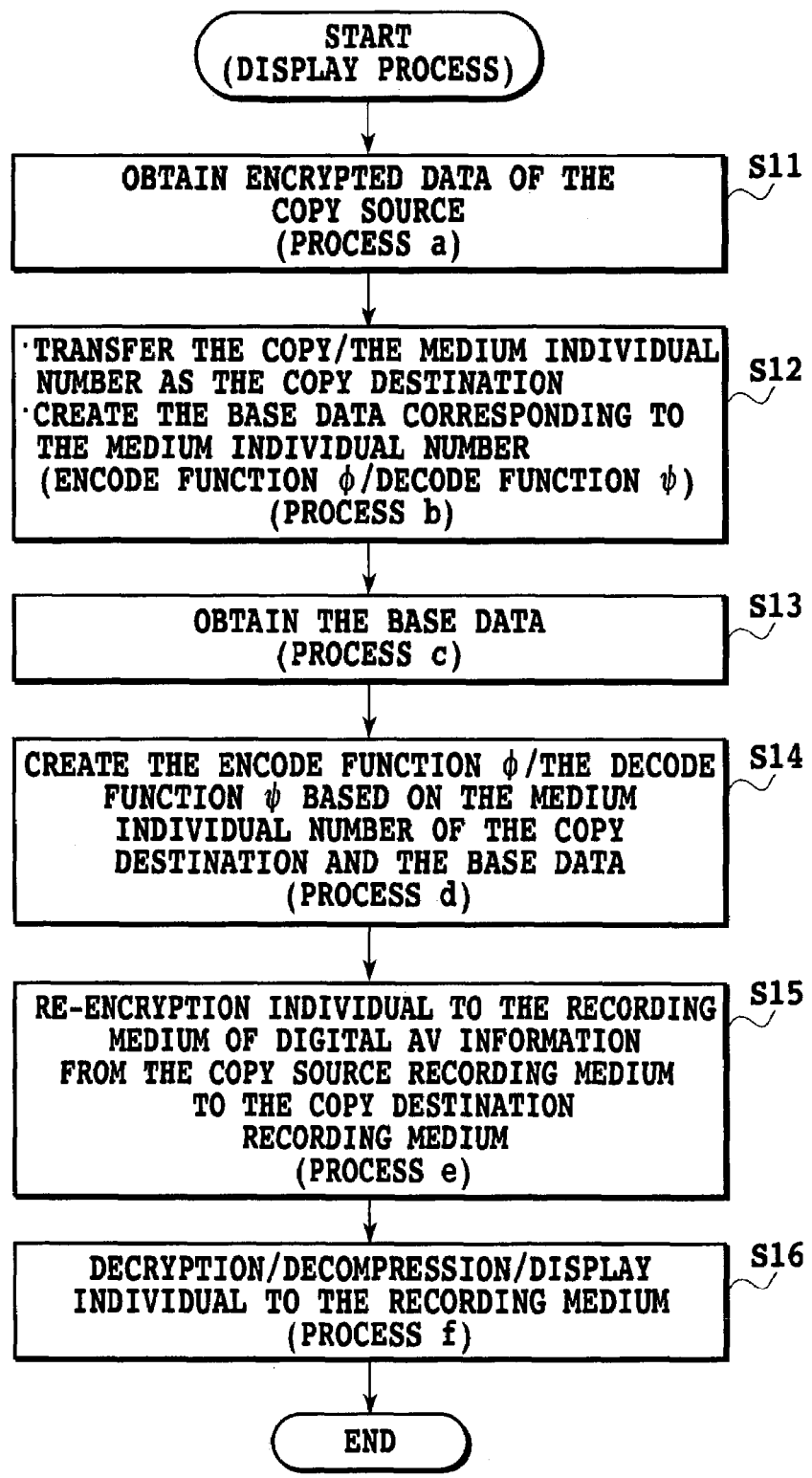
FIG. 14 is a flowchart showing an example of the display process according to a fourth embodiment of the present invention.

FIG. 14 shows a flowchart of the display process.

In a step S11, as shown in a processing step a in FIG. 15A, the encode data C2 of the removable recording medium 1 previously used is used as the data to be the copying source.

In a step S12, as shown in a processing step b in FIG. 15B, the copyright management server 200 is informed that the copying is to be performed, and a copy source medium unique number 3a of the removable recording medium 1 as the copy source and a copy destination medium unique number 3b of the removable recording medium 1 as the copy destination are transferred. At this time, it is also possible to collect the royalties.

The copyright management server 200 generates an encryption function φ and a decryption function ψ as the management keys corresponding to the medium individual number 3.

In a step S13, as shown in a process C in FIG. 15B, the copyright management server 200 transfers base data 41 that is the original of the encryption function φ and decryption function ψ corresponding to the medium individual numbers 3a and 3b to the digital AV process unit 100.

Figure 16B:
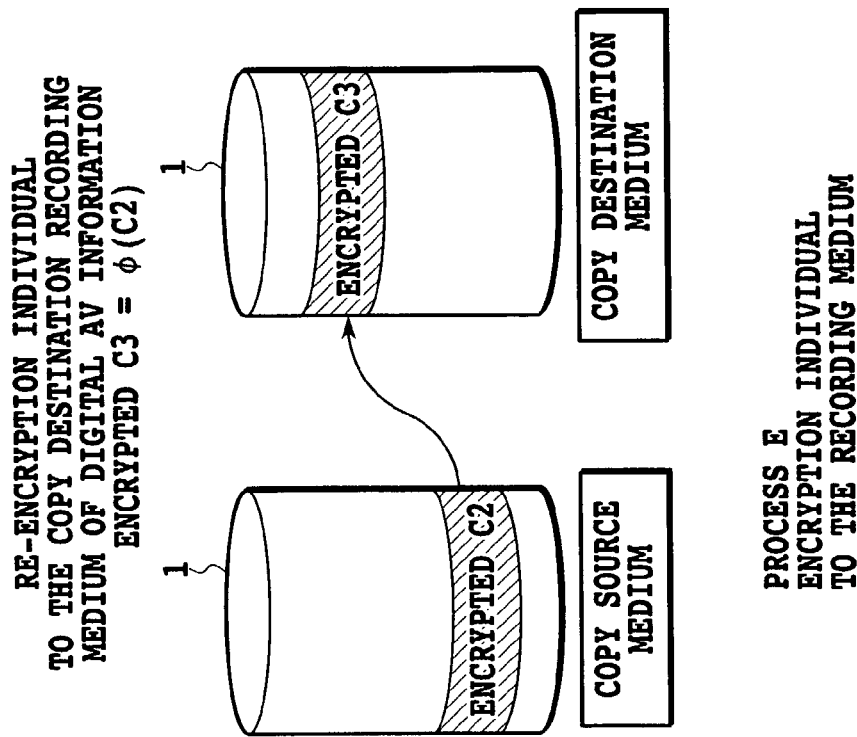
FIGS. 16A and 16B are explanatory views showing the display process of the digital AV information which is encrypted following FIGS. 15A and 15B.
Figure 16A:
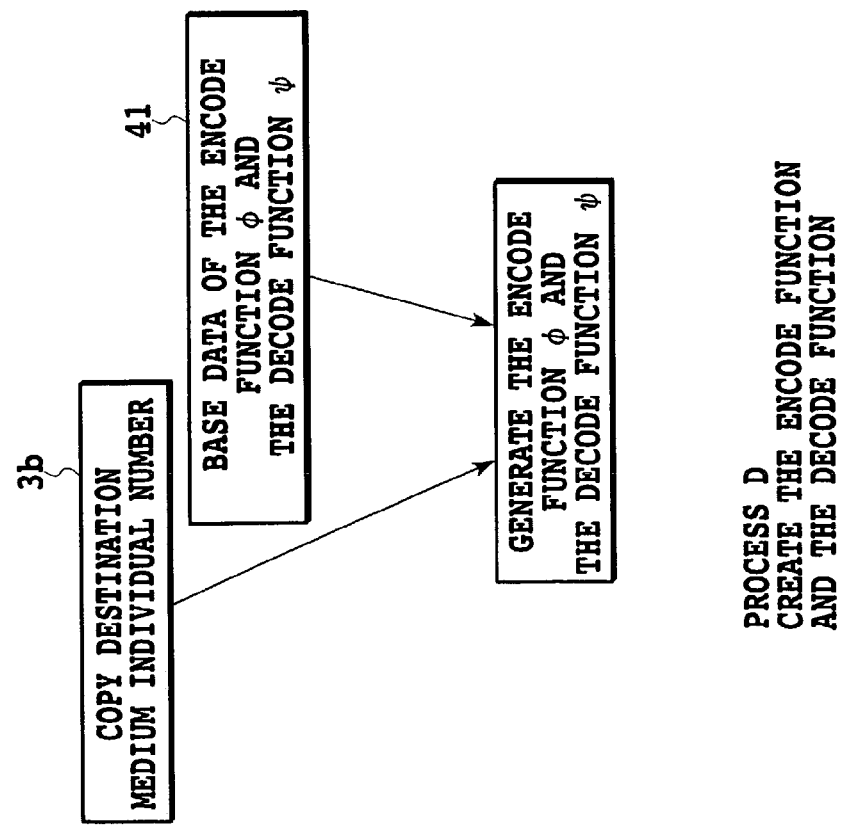

In a step S14, as shown in a process D in FIG. 16A, the base data 41 and the copy destination medium individual number 3b sent from the copyright management server 200 are used to generate the encryption function φ and decryption function ψ. At this time, the encryption function needs to be ρ×σ×φ×ψ=1.

In a step S15, as shown in a process E in FIG. 16B, the encryption function φ is used to convert the encode data C2 into C3, and the converted data is transferred to and recorded on the removable recording medium 1 as the encode data C3.

In a step S16, as shown in a process F in FIGS. 17A and 17B, the decryption function ψ is used to decrypt the cryptography of C3 when seeing the encode data C3 recorded on the removable recording medium 1. The encrypted and recorded information is thereby decoded into M as the original digital AV information 20. Thereafter, the decoded data is decompressed in the same manner as the ordinary digital AV information 20 that is not encrypted, and then is outputted to the digital input terminal 31 of the television 30 or the like.

CONCRETE EXAMPLE

Next, it will be described by taking a concrete example.

"41" is used as the medium individual number of the removable recording medium 1 and a copy of the data of the recording medium is made a request to the copyright management server 200. In the case of making a request for the copy, 217 as the copy source medium individual number 3a and 41 as the copy destination medium individual number 3b are encrypted, and the encrypted content is informed to the copyright management server 200. The copyright management server 200 creates the encode function φ and the decode function ψ by using those encrypted numbers.

$$\phi = \begin{pmatrix} 214, & 84 \\ 6, & 244 \end{pmatrix} \psi = \begin{pmatrix} 114, & 81 \\ 127, & 32 \end{pmatrix}$$

Here, 214, that is an element of the encode function φ, uses 41 as the copying destination medium individual number, and is created as 214=not (41). As mentioned above, the copyright management server 200 uses the medium individual number 41, performs an X-OR process with these functions, and then the encode function φ' and decode function ψ' are informed to the digital AV process unit 100.

$$\phi' = \begin{pmatrix} 255, & 125 \\ 47, & 221 \end{pmatrix} \psi' = \begin{pmatrix} 91, & 120 \\ 86, & 9 \end{pmatrix}$$

The digital AV process unit 100 performs the X-OR process again with 41 as the medium individual number against these functions, and then these processed functions are reconverted to the original encode function φ and the original decode function ψ.

As a re-encryption process individual to the copy destination recording medium, C3=φ(C2) is calculated.

$$C3 = \phi(C2) = \phi * C2 \mod N$$
$$= \begin{pmatrix} 214, & 84 \\ 6, & 244 \end{pmatrix} * \begin{pmatrix} 200 \\ 58 \end{pmatrix} \mod 257 = \begin{pmatrix} 221 \\ 210 \end{pmatrix}$$

This encrypted data is recorded on the copy destination recording medium.

In the case of regenerating the data recorded on the copy destination recording medium, the data is converted into the original digital AV information M by using the decode function ψ.

$$M = \psi(C3) = \psi * C3 \mod N$$
$$= \begin{pmatrix} 114, & 81 \\ 127, & 32 \end{pmatrix} * \begin{pmatrix} 221 \\ 210 \end{pmatrix} \mod 257 = \begin{pmatrix} 56 \\ 92 \end{pmatrix}$$

Thus, the data is converted into the original digital AV information 20, and then the information is decompressed and the decompressed data is possible to regenerate.

(Illegal Copy)

In the case of using another removable recording medium 1, the encode function is different since the medium individual number is different, and thus the data to be actually recorded on the other removable recording medium 1 is also different. In addition, the decode function is also different, so that the recorded data is not converted into correct digital AV information and cannot be seen if it is just digitally copied. For this reason, it is possible to securely protect the digital AV information.

(Display Example)

FIGS. 18A and 18B show confirmation messages 61 and 62 for seeing the encrypted digital AV information 20.

FIGS. 19A and 19B show confirmation messages 63 and 64 for copying the encrypted digital AV information 20.

While it can be automatically decrypted without display on condition of no charge, the detailed setting can be performed, such as no charge payable only for seeing but charges payable for both seeing and copying.

FIFTH EXAMPLE

Next, a fifth embodiment of the present invention will be described based on FIGS. 20 to 24. Moreover, the same portions as the aforementioned examples will be given the same symbols, and the description thereof will be omitted.

This example is corresponding to claims 26 to 39, and relates to the copyright management system and information process unit and method.

Hereafter, it will be described by taking a concrete example.

<System Structure>

Figure 20:
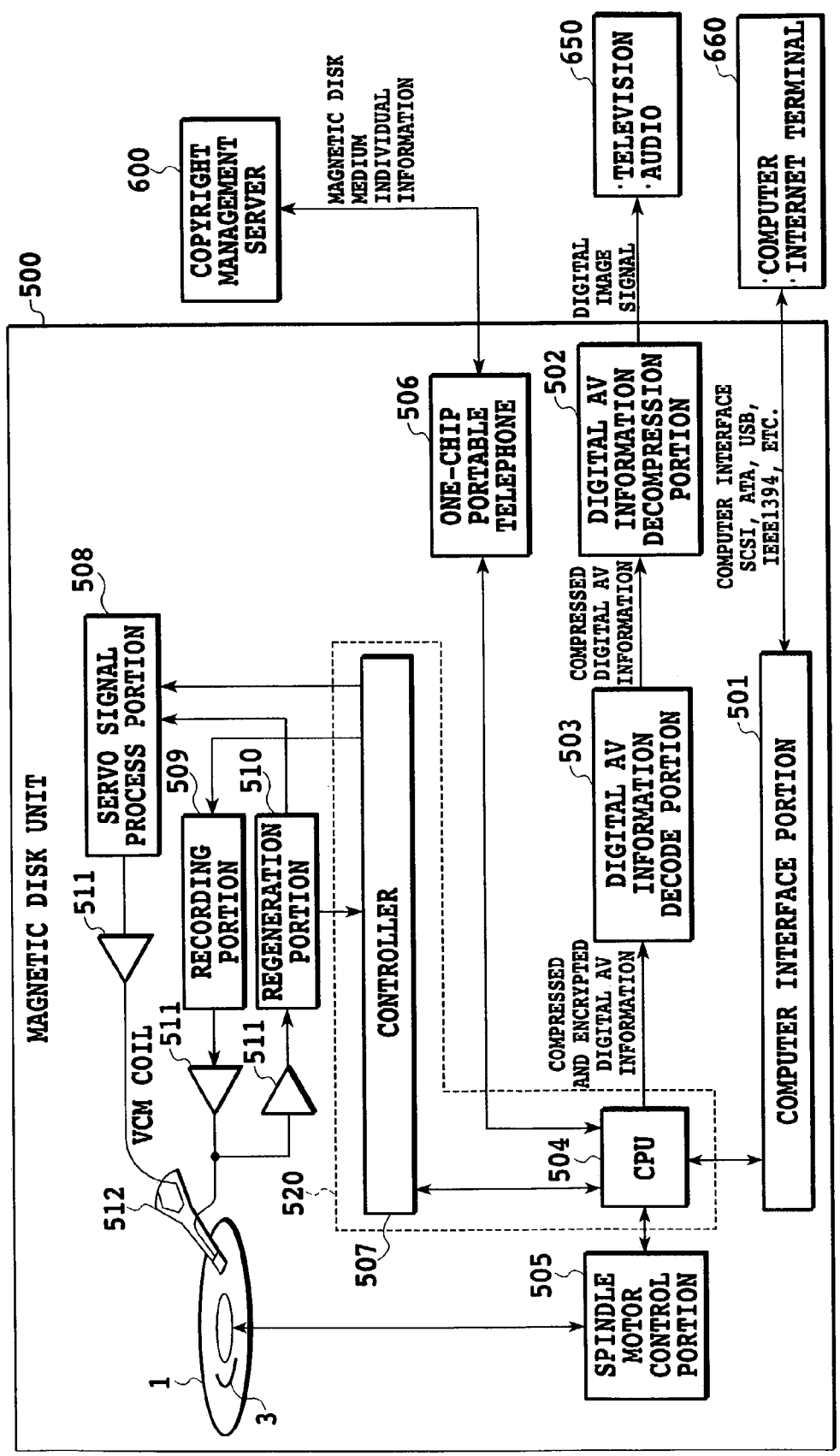
FIG. 20 is a block diagram showing the configuration of the copyright management system according to a fifth embodiment of the present invention.

FIG. 20 shows a configuration example of the copyright protection system.

This system is broadly structured by a magnetic disk unit 500 as the information processing unit, a copyright management server 600, audiovisual unit 650 comprised of the television, audio and so on, and terminal unit 660 comprised of the computer, Internet terminal and so on.

The magnetic disk unit 500 has a computer interface portion 501 connected to the terminal unit 660, a digital AV information decompress portion 502 connected to the audiovisual unit 650, a digital AV information decode portion 503, a CPU 504, a spindle motor control portion 505, a one-chip portable telephone 506 as a digital radio unit for interfacing with the copyright management server 600, a controller 507, a servo signal process portion 508, a recording portion 509, a regenerating portion 510, an amplifier 511, a magnetic head 512 of which rotation is controlled by a spindle motor, and a magnetic disk medium 1. Moreover, the CPU 504 and the controller 506 constitute an arithmetic unit 520.

Thus, the magnetic disk unit 500 needs to include the information individual to the magnetic disk unit 500 or the magnetic disk medium 1 (individual information) in addition to the functions of the magnetic disk unit in the prior art.

And the digital AV information compressed and encrypted by the CPU 504 is formed as the digital AV information compressed by the digital AV information decode portion 503, and the compressed data is outputted as a digital video signal by the digital AV information decompression portion 502 and is sent to the audiovisual unit 650 such as the television and audio.

(Characteristic Structure Related to the Present Invention)

Figure 21:
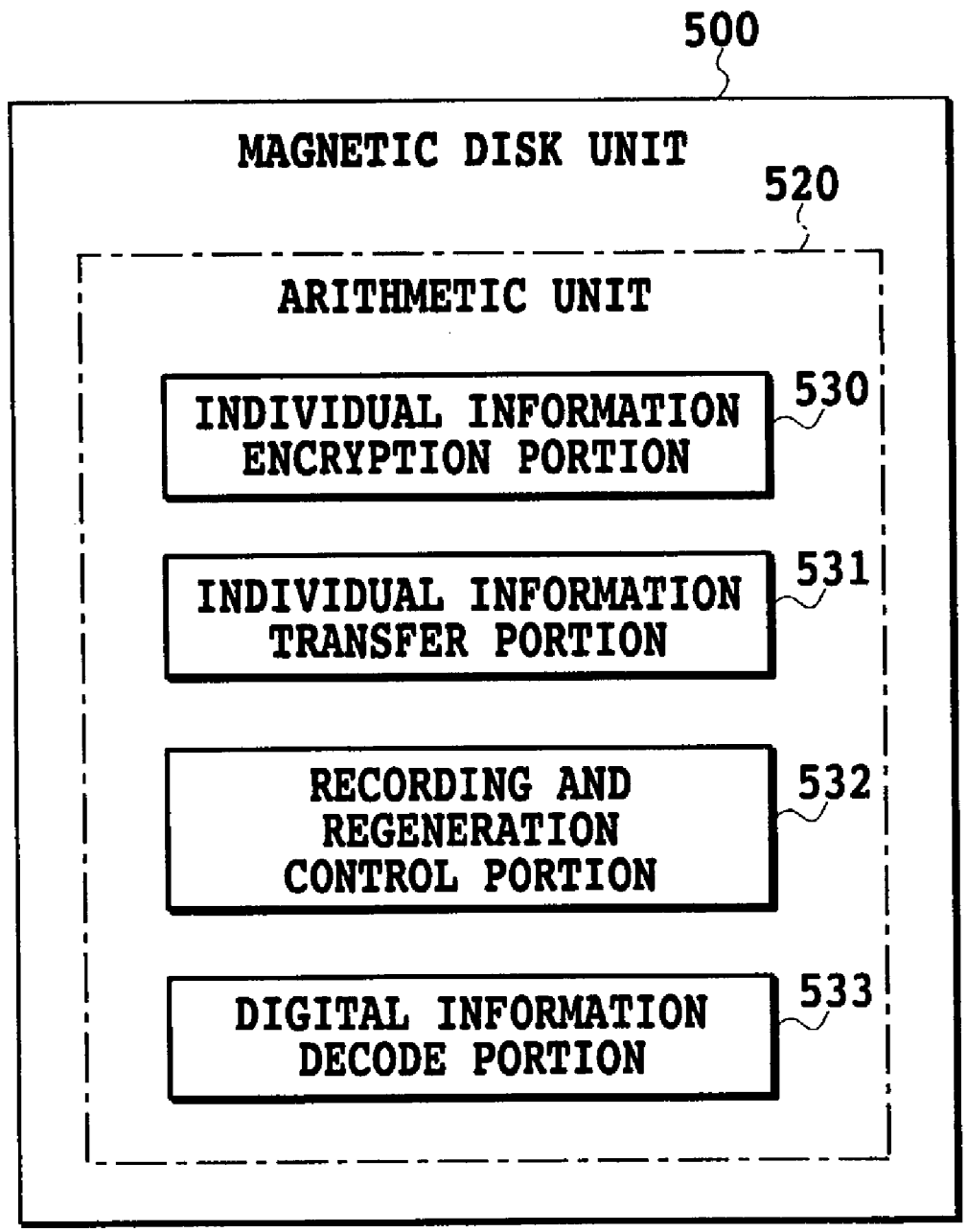
FIG. 21 is a block diagram showing the configuration of the digital AV processing apparatus included in a system in FIG. 20.

FIG. 21 shows a characteristic structure provided to the magnetic disk unit 500.

The arithmetic unit 520 of the magnetic disk unit 500 is provided with the magnetic disk medium 1 of the structure in the above mentioned first example, an individual information encryption portion 530, an individual information transfer portion 531, a recording and regeneration control portion 532 and a digital information decode portion 533. Moreover, it also has the CPU 404, RAM 405 and ROM 406 and so on as in the aforementioned FIG. 3.

The individual information encryption portion 530 has functions of reading the media individual information 3 as a decryption key of the cryptography recorded in the magnetic disk medium 1 and encrypting the read media individual information 3 by using a public key transferred from the copyright management server 600.

The individual information transfer portion 531 has a function of transferring the encrypted media individual information 3 to the copyright management server 600 via communication means.

The recording and regeneration control portion 532 has a function of recording and regenerating the encrypted digital information transferred from the copyright management server 600 on the magnetic disk medium 1.

The digital information decode portion 533 has a function of, by using the media individual information 3 as the decryption key, decoding the encrypted digital information recorded on the magnetic disk medium 1.

Figure 22:
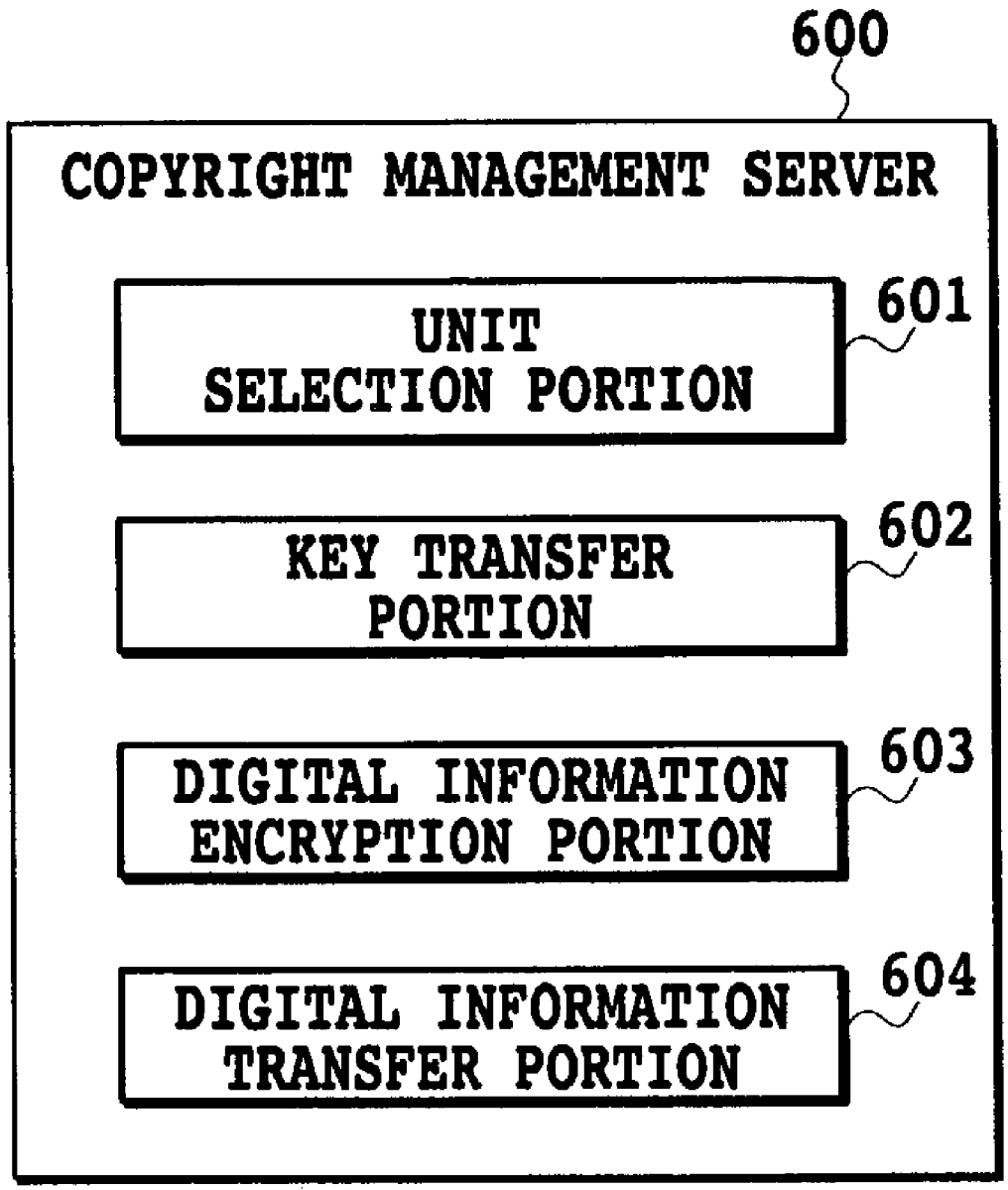
FIG. 22 is a block diagram showing the configuration of the copyright management server included in the system in FIG. 20.

FIG. 22 shows the characteristic structure provided to the copyright management server 600.

The copyright management server 600 is provided with a unit selection portion 601, a key transfer portion 602, a digital information encryption portion 603 and a digital information transfer portion 604. Moreover, additionally, the CPU 404, RAM 405 and ROM 406 and so on, as with the magnetic disk unit 500 in FIG. 21 are also provided.

The unit selection portion 601 has a function of selecting desired digital information and the information process unit of a transfer destination based on an instruction for starting the encryption from a terminal unit.

The key transferring portion 602 has a function of transferring the public key to the selected predetermined magnetic disk unit 500 via the communication means.

The digital information encryption portion 603 has a function of encrypting the digital information by using the media individual information 3 so that a decoding process can be performed by the media individual information 3 encrypted and transferred from the magnetic disk unit 500.

The digital information transfer portion 604 has a function of transferring the encrypted digital information to the magnetic disk unit 500 via the communication means.

<System Flow>

Next, the flow of this system will be described.

(Data Flow)

Figure 23:
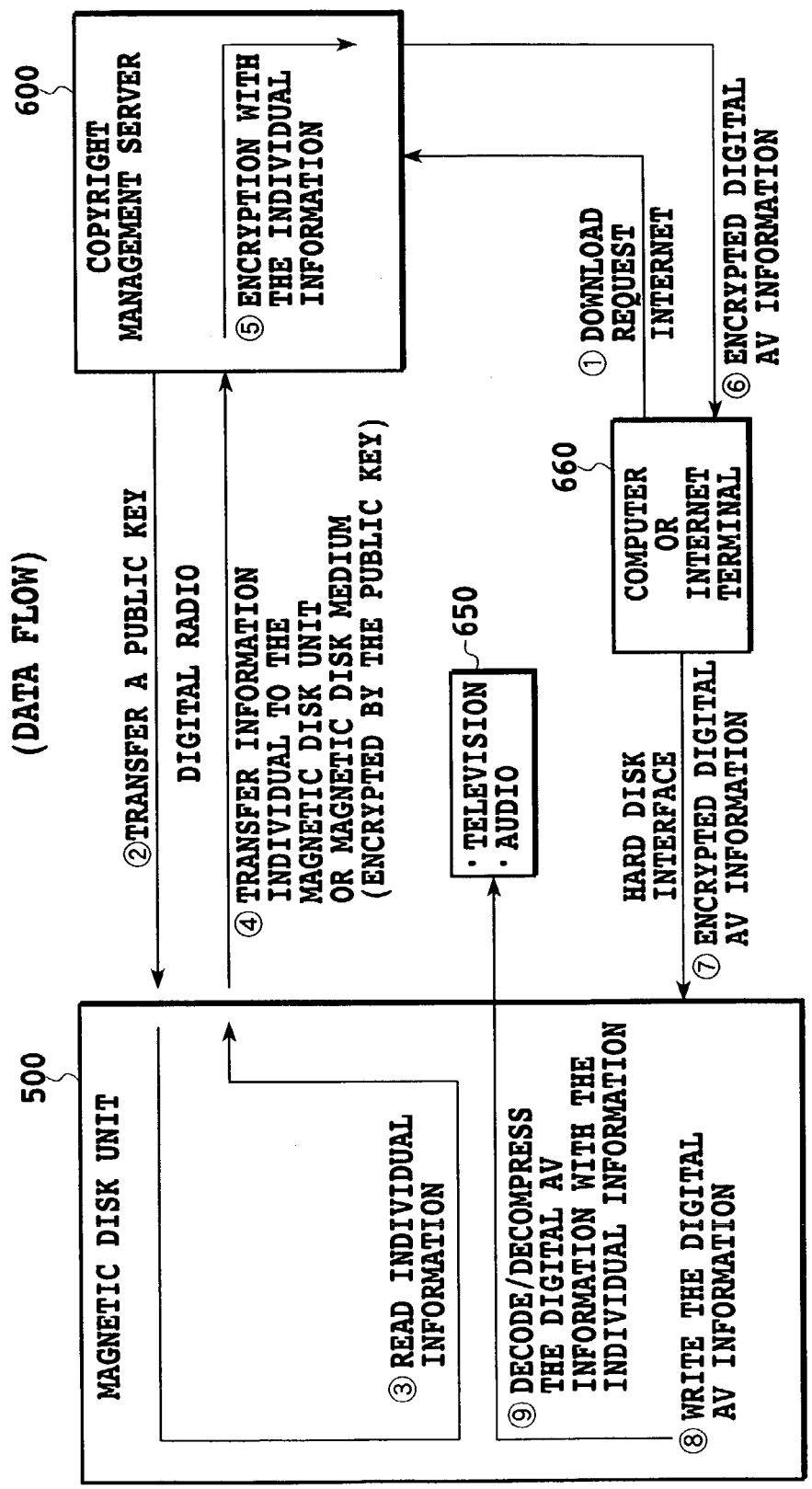
FIG. 23 is an explanatory view showing a data flow in a system including a magnetic disk unit.

FIG. 23 shows a data flow in the system centering on the magnetic disk unit 500 related to the present invention.

① First, by using the computer or the Internet terminal 660, target digital AV information is selected and a download request is performed. At this time, a telephone number and an IP address are designated so that the copyright management server 600 can access the magnetic disk unit 500, and a payment is settled when the accounting is necessary.

② Then, the copyright management server 600 transfers the public key to the target magnetic disk unit 500 through the digital radio.

③ The magnetic disk unit 500 reads the media individual information 3 inside, and ④ the information 3 is encrypted by using the transferred public key, and then the encrypted information 3 is transferred to the copyright management server 600 through the digital radio.

⑤ The copyright management server 600 encrypts the digital AV information by the transferred and encrypted information 3 that can also be decoded.

⑥ The encrypted digital AV information is distributed through the ordinary Internet and so on.

⑦ The computer or the Internet terminal 660 uses a hard disk interface (SCSI, ATA, USB, IEEE1394) and so on ⑧ and records the encrypted digital AV information on the magnetic disk unit 500.

When seeing and hearing the encrypted digital AV information as the actual image or music, ⑨ the information individual to the magnetic disk unit 500 or the magnetic disk medium 1 is read by the magnetic disk unit 500, and the encrypted digital AV information is decoded by using the read individual information. Thus, the digital AV information thereby becomes visible and audible as the image and voice from the television and audio 650.

(Encryption Process)

Figure 24:
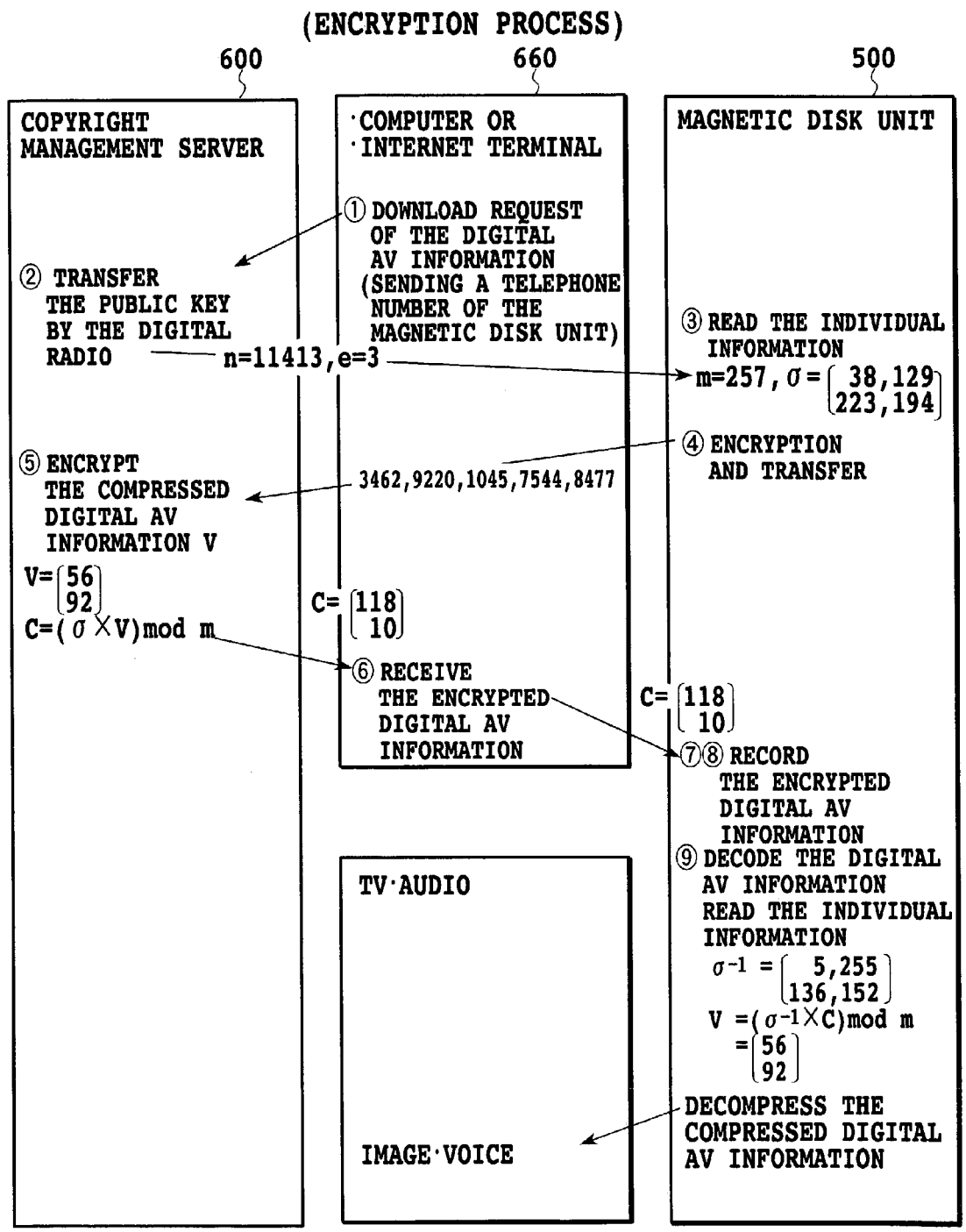
FIG. 24 is an explanatory view showing an example of an encryption process.

FIG. 24 shows a concrete example of the encryption process in this example.

① A user selects the target digital AV information by using the computer or the Internet terminal 660. At this time, the telephone number of the magnetic disk unit 500 is transferred.

② While the copyright management server 600 needs to transfer the public key for the encryption to the magnetic disk unit 500. This time, RSA is used as a cipher for the copyright management server 600 and the magnetic disk unit 500.

Here, the calculation of the RSA is facilitated by using small prime numbers. p=101, q=113 are used as two prime numbers. In the RSA, n=101×113=11413 and φ(n)=(p−1)×(q−1)=11200 are prepared. If e=3 is selected as the public key, a secret key d=7467 satisfying (e×d) modφ(n)=1 is acquired. Then, the copyright management server 600 transfers n=11413 and e=3 as the public keys to the magnetic disk unit 500.

③ The magnetic disk unit 500 reads the media individual information 3, that is, an individual prime number m=257, an individual function σ as a matrix of 2×2, and a matrix σ⁻¹ of 2×2 as an inverse function of the individual function.

Here, the following relational expression holds between the individual functions σ and σ⁻¹.

$$(\sigma * \sigma^{-1}) \bmod m = E (E: \text{Unit matrix})$$

$$m = 257 \quad \sigma = \begin{pmatrix} 38 & 129 \\ 223 & 194 \end{pmatrix} \quad \sigma^{-1} = \begin{pmatrix} 5 & 255 \\ 136 & 152 \end{pmatrix}$$

The magnetic disk unit 500 performs these encryption process of m and σ as the media individual information 3 by using the public keys.

$(m\hat{\;}e) \bmod n = (257\hat{\;}3) \bmod 11413 = 3462$ $(\sigma_{11}\hat{\;}e) \bmod n = (38\hat{\;}3) \bmod 11413 = 9220$ $(\sigma_{12}\hat{\;}e) \bmod n = (129\hat{\;}3) \bmod 11413 = 1045$ $(\sigma_{21}\hat{\;}e) \bmod n = (223\hat{\;}3) \bmod 11413 = 7544$ $(\sigma_{22}\hat{\;}e) \bmod n = (194\hat{\;}3) \bmod 11413 = 8477$ The magnetic disk unit 500 transfers these encrypted values to the copyright management server 600 through the digital radio.

④ The copyright management server 600 performs a decode process by using the RSA based on the transferred encrypted values.

The decode process uses d, n for the transferred encrypted values, and obtains the following formulas as well as the media individual information 3 of the magnetic disk unit 500.

$(3462\hat{\;}d) \bmod n = (3462\hat{\;}7467) \bmod 11413 = 257$ $(9220\hat{\;}d) \bmod n = (9220\hat{\;}7467) \bmod 11413 = 38$ $(1828\hat{\;}d) \bmod n = (1045\hat{\;}7467) \bmod 11413 = 129$ $(7544\hat{\;}d) \bmod n = (7544\hat{\;}7467) \bmod 11413 = 223$ $(8477\hat{\;}d) \bmod n = (8477\hat{\;}7467) \bmod 11413 = 194$ $$m = 257 \quad \sigma = \begin{pmatrix} 38 & 129 \\ 223 & 194 \end{pmatrix}$$

⑤ The copyright management server 600 encrypts the actual digital AV information by using the media individual information 3. The encryption of data V of the digital AV information is C=(σ*V) mod m.

$$\text{If } V = \begin{pmatrix} 56 \\ 92 \end{pmatrix}, C = \begin{pmatrix} 38 & 129 \\ 223 & 194 \end{pmatrix} * \begin{pmatrix} 56 \\ 92 \end{pmatrix} \bmod 257 = \begin{pmatrix} 118 \\ 10 \end{pmatrix}$$

Here, the digital AV information may be the one already compressed by MPEG-2 or the like.

⑥ The copyright management server 600 transfers the encrypted digital AV information C to the user via the Internet or the like.

⑦ The computer and the Internet terminal 660 transfers this transferred encrypted data to the magnetic disk individual 500.

⑧ The magnetic disk unit 500 records the transferred encrypted digital AV information C.

⑨ To see this recorded encrypted information, it is necessary to perform a decode process its encrypted information by using the media individual information 3 again.

That is, by using σ⁻¹ as another media individual information 3 on the magnetic disk medium 1, V=(σ⁻¹*C) mod m against the encrypted digital AV information is calculated, and then the calculated encrypted information can be converted into original digital AV information.

$$(\sigma^{-1} * C) \bmod m = \begin{pmatrix} 5 & 255 \\ 136 & 152 \end{pmatrix} * \begin{pmatrix} 118 \\ 10 \end{pmatrix} \bmod 257 = \begin{pmatrix} 56 \\ 92 \end{pmatrix}$$

Thus, the encrypted digital AV information is returned to the original digital AV information.

Normally, the digital AV information is in a state of being compressed by MPEG-2 or the like, and the compressed information is decompressed to output the decompressed information to the television and audio 650, thereby actually seeing as well as hearing.

(Function Definition for Encryption/Decryption)

Moreover, the function definition for the encryption and decryption to be used in the copyright protection system related to the present invention will be described here. Values ρ, σ and φ are the matrix (n×n) for the encryption. N is a large prime number.

As the definition of the calculation rule for an encrypted matrix, a multiplication regards the remainder as the solution that each element is divided by N after performing the multiplication of the matrix as follows.

(ρ×σ=ρ*σ mod N)

An inverse matrix is also defined as follows.

(σ×σ⁻¹=σ*σ⁻¹ mod N=E)

M is the digital AV data that is not encrypted.

C1 is the digital AV data that is encrypted.

C2 is the digital AV data that is encrypted individual to the medium.

$$C1=\rho(M)=\rho*M \bmod N$$

$$C2=\sigma(C1)=\sigma*C1 \bmod N$$

$$M=\tau(C2)=\tau*C2 \bmod N$$

Here, the matrix of the decryption calculated by $$\tau=\rho^{-1}*\sigma^{-1} \bmod N.$$

C3 is the digital AV data that is encrypted individual to the medium.

$$C3=\phi(C2)=\phi*C2 \bmod N$$

$$M=\psi(C3)=\psi*C3 \bmod N$$

Here, the matrix of the decryption calculated by $$\psi=\rho^{-1}*\sigma^{-1}*\phi^{-1} \bmod N.$$

SIXTH EXAMPLE

Next, a sixth embodiment of the present invention will be described based on FIGS. 25 to 30. Moreover, the same portions as the aforementioned examples are numbered likewise omitting the description thereof.

This example is a deformed example of the fifth example, and is corresponding to claims 26 to 39 related to the copyright management system, information process unit and information process method.

Hereafter, it will be described by taking concrete examples.

Figure 25:
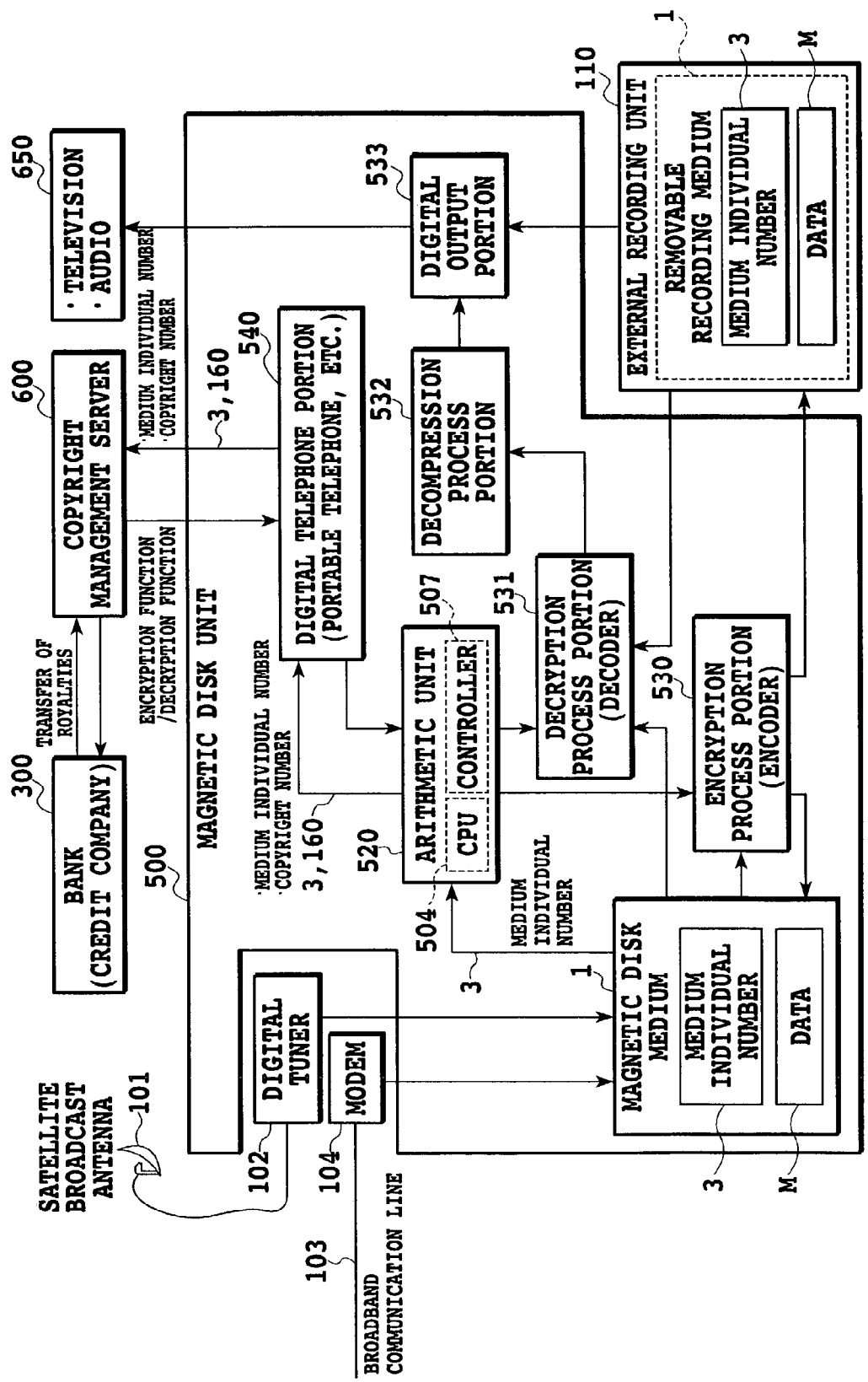
FIG. 25 is a block diagram showing the configuration of the copyright management system according to a sixth embodiment of the present invention.

FIG. 25 shows the structure of the magnetic disk unit 500 and peripherals thereof to be used in this example. Moreover, FIG. 25 is similar to the structure of the third example in FIG. 8, and the portions different therefrom will be described here.

The peripherals is provided with an antenna 101 capable of receiving the digital broadcast and a digital tuner 102 in order to obtain the data from the outside, the modem 104 and so on for receiving the information from the broadband communication line 103, and the television and audio 650 for outputting the digital AV information. In addition, an interface cable is added for copying the recorded data to the removable recording medium 1 as the external recording unit 110.

The magnetic disk unit 500 is provided with the arithmetic unit 520, the encryption process portion 530 for processing the encrypted data, a decryption process portion 531, and the magnetic disk medium 1 for recording the actual information, and further, the decompression process portion 532 for converting the digital AV information into the actual image, a digital output portion 533 for outputting the images and voice to the television and so on, and a digital telephone portion 540 for performing the authentication to the outside for the copyright protection.

<System Operation>

Next, the operation of this system will be described.

Figure 26:
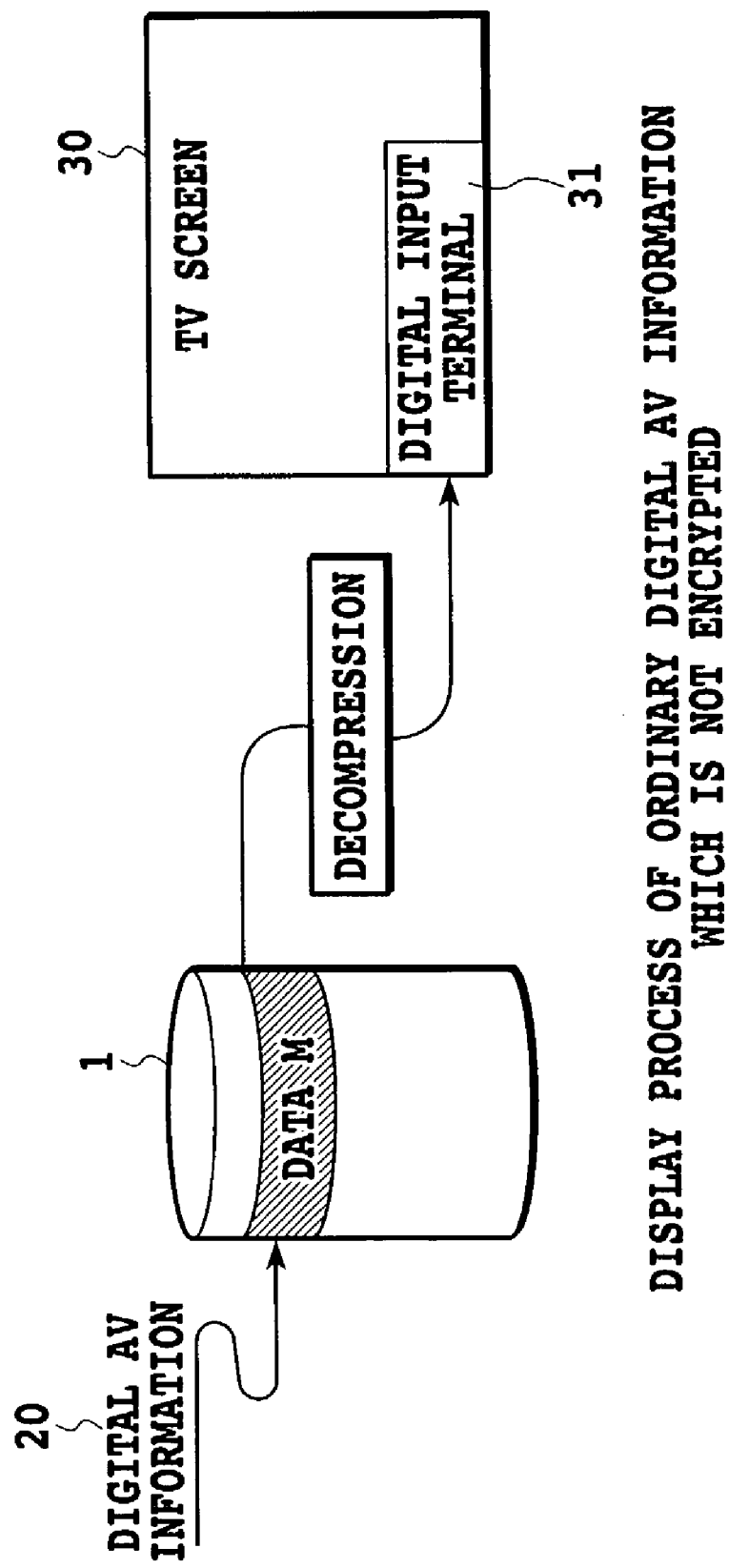
FIG. 26 is an explanatory view showing the display process of the ordinary digital AV information which is not encrypted.

FIG. 26 explains the display process of the digital AV information 20 that is not encrypted.

The digital AV information 20 obtained from the digital broadcast or broadband is normally compressed, and the compressed information is only decompressed to directly output the decompressed information to the digital input terminal 31 of the television 30 and so on.

(Display Process)

Next, an example of the display process for displaying the encrypted digital AV information related to the present invention will be described based on FIGS. 27 to 30.

The digital AV information 20 as the original is encrypted by using the encryption function ρ at the data outgoing side, and the encrypted information 20 is transmitted as C1. At this time, in the case of decrypting at least the header indicating encryption and the cipher, it is necessary to simultaneously send the data of the contact (the access method to the copyright management server 600 such as the telephone number) to be informed.

Figure 27:
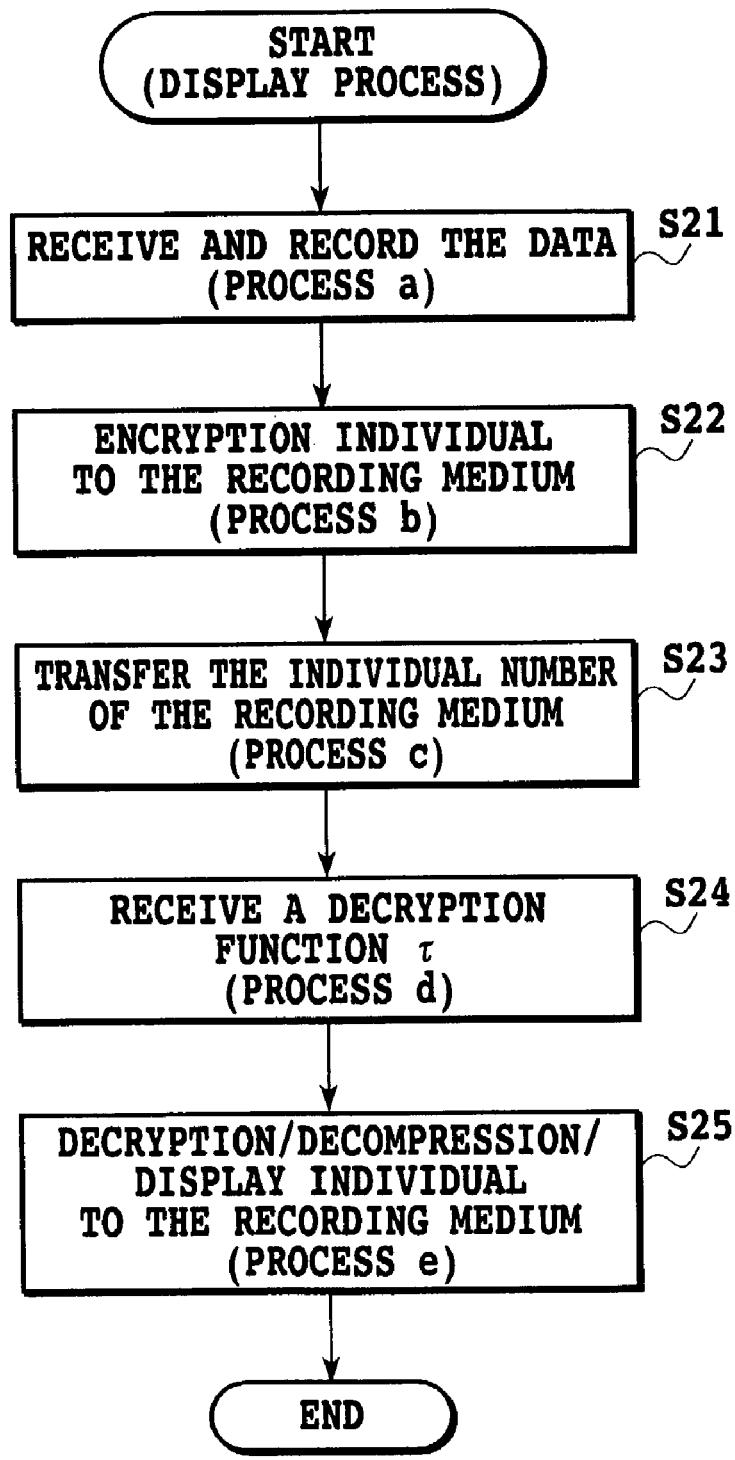
FIG. 27 is a flowchart showing an example of the display process.

FIG. 27 is a flowchart showing the display process.

In a step S21, as shown in a process A in FIG. 28A, the encrypted data C1 is recorded on the magnetic recording medium 1 in real time.

Figure 28:
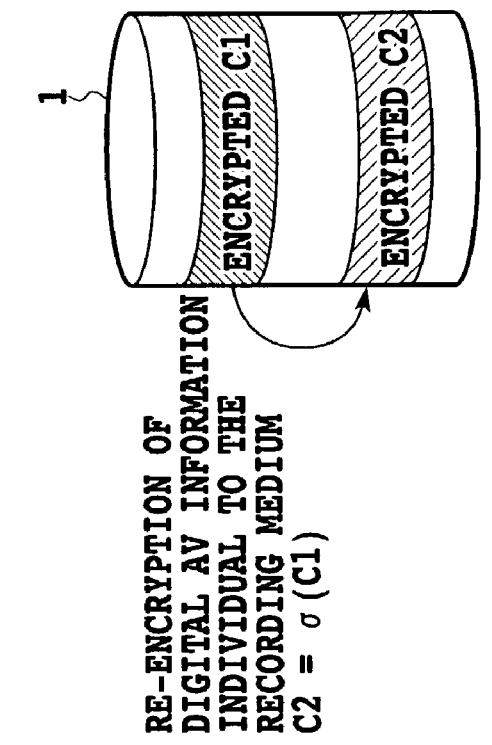
FIGS. 28A and 28B are explanatory views showing the display process of the digital AV information which is encrypted.
Figure 28B:
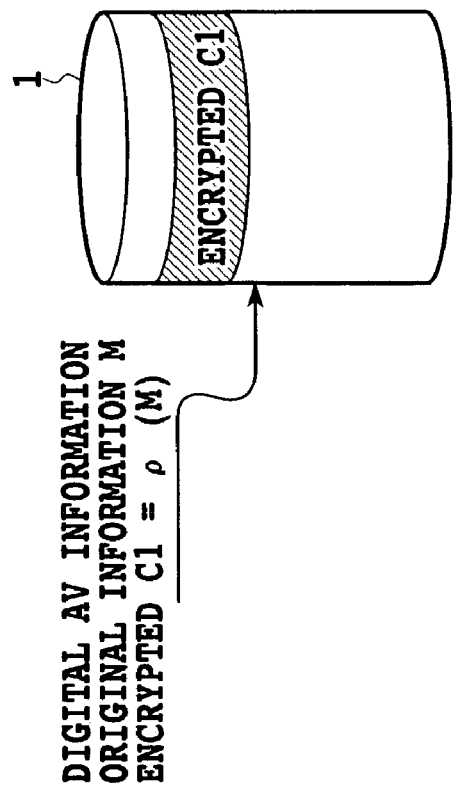

In a step S22, as shown in a process B in FIG. 28B, by using the encryption function σ individual to the recording medium, the encrypted data C1 as the received data (the digital AD information 20) is reconverted into the encrypted data C2 again, and the encrypted data C2 is recorded. If the encrypted data C2 is completed, C1 is no longer necessary and C1 may be deleted. In addition, in the case where computation process speed of the encryption is faster than input speed of the digital AV information 20 as the original, the encryption process may be directly performed to record C2 without recording C1.

The digital AV information 20 can be seen after decrypting the cipher by processes from a process C onward.

Figure 29:
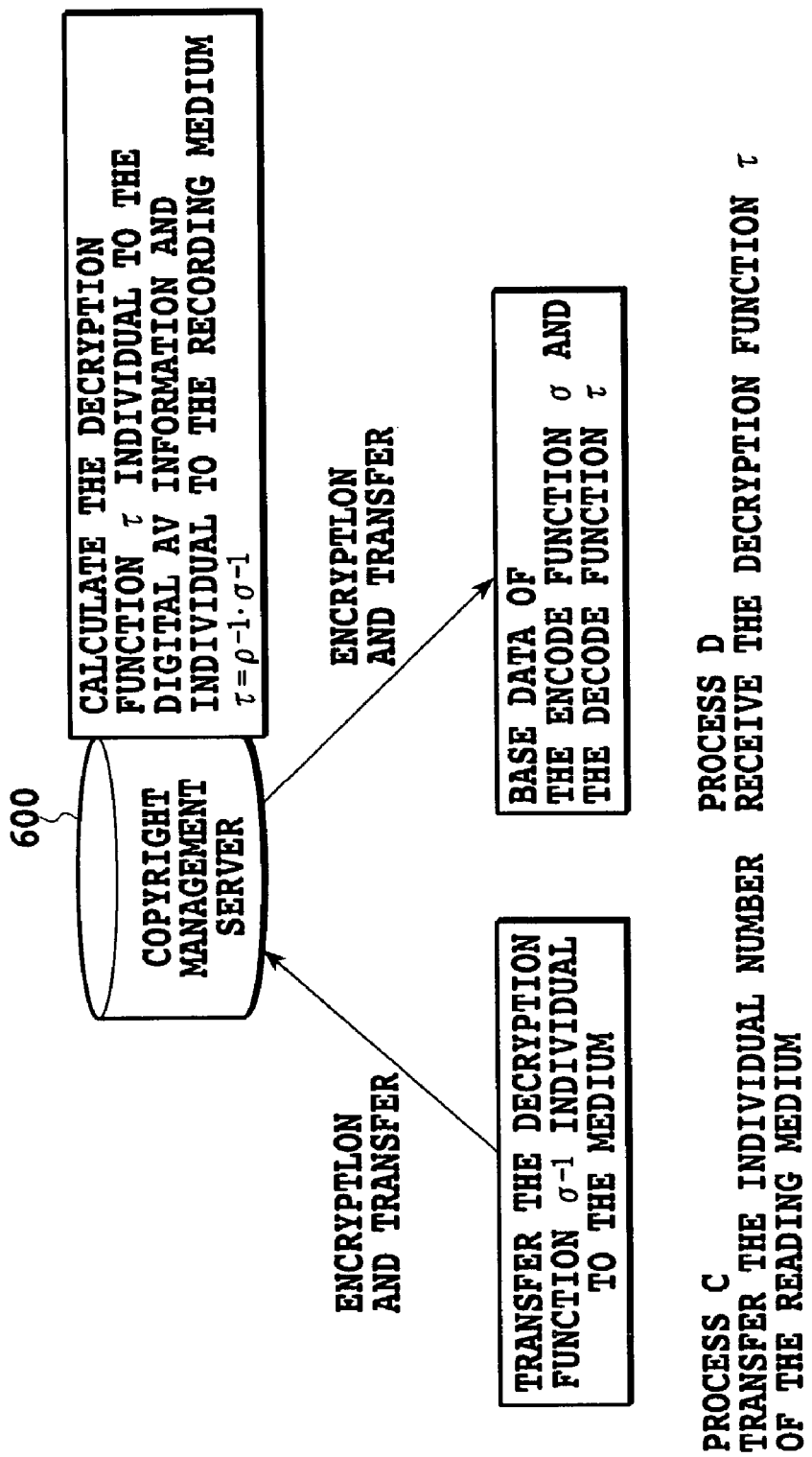
FIG. 29 is an explanatory view showing the display process of the digital AV information which is encrypted following FIGS. 28A and 28B.

In a step S23, as shown in the process C in FIG. 29, the encryption function or the decryption function individual to the recording medium is transferred to the copyright management server 600 via the digital telephone portion 540.

At this time, the copyright protection becomes securer if transferred by another encryption means so that the encryption function or the decryption function individual to the recording medium will not be known. In the case of collecting the fee when seeing the information content, it becomes possible by incorporating a system for accounting when connected to the copyright management server 600 via the digital telephone portion 540.

The copyright management server 600 calculates the digital AV information and decryption function τ individual to the medium, by using the encryption function σ or decryption function $\sigma^{-1}$ individual to the medium and the encryption function ρ or decryption function $\rho^{-1}$ managed by the copyright management server 600. In the example of this time, the decryption function τ is calculated by $\rho^{-1} \times \sigma^{-1}$.

In a step S24, as shown in a process D in FIG. 29, the decryption function τ individual to the calculated digital AV information 20 as well as individual to the recording medium is transferred to the magnetic disk unit 500 via digital telephone portion 540. Here, the copyright protection is also securer by performing a different encryption process to the decryption function τ to be transferred. Communication with the copyright management server 600 via the digital telephone portion 540 is finished at the processes c and d.

Figure 30:
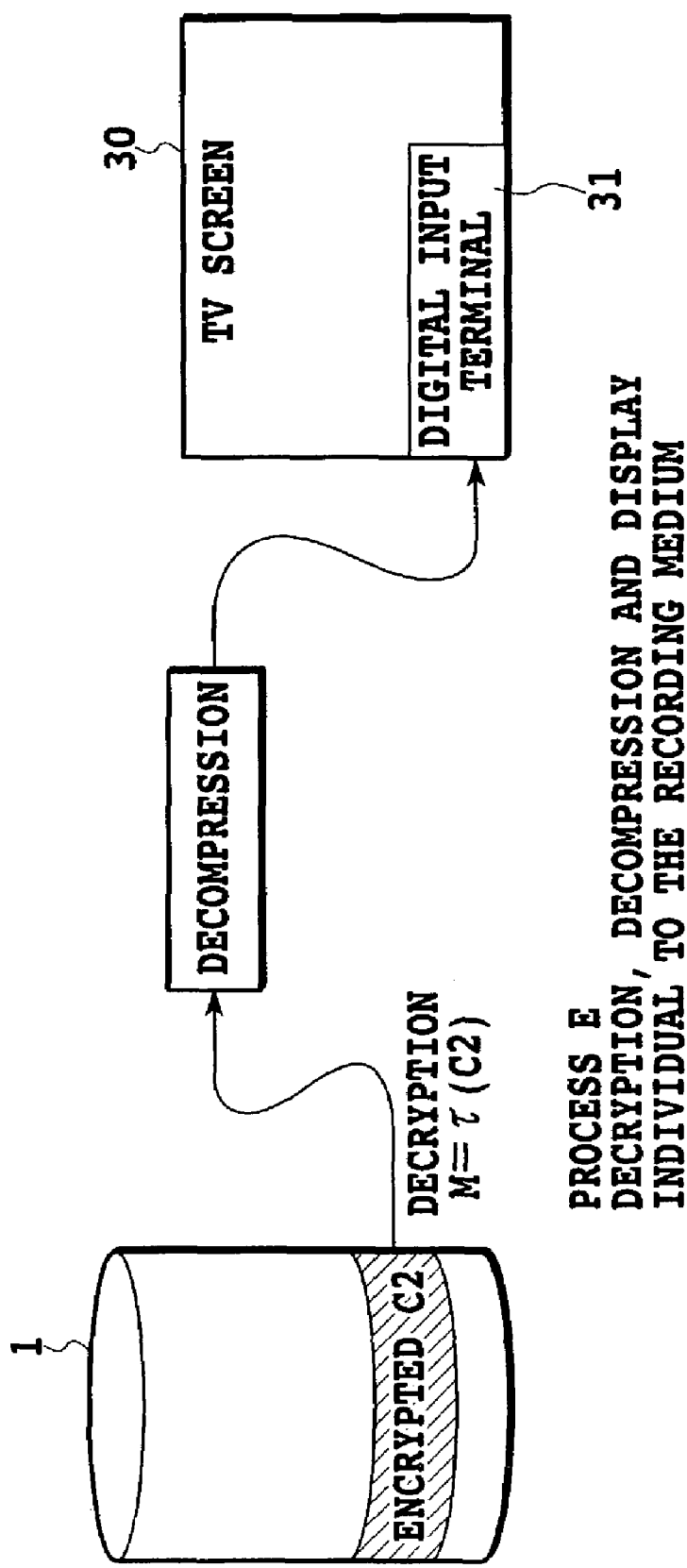
FIG. 30 is an explanatory view showing the display process of the digital AV information which is encrypted following FIG. 29.

In a step S25, as shown in a process E in FIG. 30, the cipher of C2 is decrypted by using the decryption function τ when seeing the data. Thus, the encrypted and recorded information is decoded to M as the original digital AV information. Thereafter, the decoded information can be regenerated by performing the same decompression as the ordinary digital AV information that is not encrypted, and the decompressed information outputted to the digital input terminal 31 of the television 30 or the like.

This process will be described, by using the encryption function ρ and decryption function ρ⁻¹ individual to the digital AV information as well as the encryption function σ and decryption function σ⁻¹ individual to the medium.

Here, N=257=2^8+1 is used as a common prime number for the overall encryption process. In addition, while the matrix is calculated by 2×2 in order to facilitate the calculation. By increasing the value of N as well as enlarging the matrix arrangement, calculation time for the inverse matrix increases in particular, and thus the possibility of hacking can be reduced.

First, the original information $$M = \begin{pmatrix} 56 \\ 92 \end{pmatrix}$$

and the encryption function ρ individual to the digital AV information were prepared, and the encryption process unique to the digital AV information was performed.

$$\rho = \begin{pmatrix} 38, & 129 \\ 215, & 93 \end{pmatrix}$$

Moreover, as restrictions regarding the matrix of ρ, it is necessary that the matrix is not 0 (|ρ|≠0), and the value of each element is smaller than N. If this is satisfied, the value of each element can be an arbitrary value. As the encryption function exists almost infinitely if N is large and the arrangement is enlarged (if the arrangement is n×n, the number of the encryption functions is approximately N^(n×n)), it is easy to form all the different encryption functions even if there are many pieces of the digital AV information or many pieces of the recording medium.

As the calculation process of the encryption, ρ(M)=ρ*M mod N is defined. Thus, $$C1 = \rho * M \bmod N = \begin{pmatrix} 39, & 187 \\ 215, & 93 \end{pmatrix} * \begin{pmatrix} 56 \\ 92 \end{pmatrix} = \begin{pmatrix} 113 \\ 36 \end{pmatrix}$$

C1 is distributed as the encrypted digital AV information.

Next, σ is used as the encryption function individual to the medium to perform the encryption process again. In the calculation process of the encryption, σ(C1)=σ*C1 mod N is calculated likewise.

$$\sigma = \begin{pmatrix} 38, & 129 \\ 223, & 194 \end{pmatrix}$$

$$C2 = \sigma * C1 \bmod N = \begin{pmatrix} 38, & 129 \\ 223, & 194 \end{pmatrix} * \begin{pmatrix} 113 \\ 36 \end{pmatrix} = \begin{pmatrix} 200 \\ 58 \end{pmatrix}$$

Thus, a record process can be performed based on the encryption individual to this digital AV information and individual to this recording medium.

Next, to calculate the decryption function τ for decrypting this cipher, the decryption function σ⁻¹ that is the inverse matrix of the encryption function individual to the medium is transferred to a copyright database by using a digital telephone. Here, the decryption function σ⁻¹ individual to the medium is calculated the following formula. The arithmetic rule of the matrix regards the remainder after dividing each element as a result of the multiplication by N as the solution. This rule is similar to the arithmetic process of the encryption.

σ·σ⁻¹=σ*σ⁻¹ mod N=E (· is the calculation rule, * is multiplication)

$$\sigma = \begin{pmatrix} a, & b \\ c, & d \end{pmatrix} \text{ If } \sigma^{-1} = \begin{pmatrix} e, & f \\ g, & h \end{pmatrix}$$

$$\sigma \cdot \sigma^{-1} = \begin{pmatrix} ae+bg \bmod N, & af+bh \bmod N \\ ce+dg \bmod N, & cf+df \bmod N \end{pmatrix} = \begin{pmatrix} 1, & 0 \\ 0, & 1 \end{pmatrix}$$

σ⁻¹ is obtained by calculating e, f, g, and h satisfying the condition of this formula in sequence. The formula is as follows.

$$\sigma^{-1} = \begin{pmatrix} 5, & 255 \\ 136, & 152 \end{pmatrix}$$

The calculated σ⁻¹ is transferred to the copyright management server 600.

The copyright management server 600 calculates the decryption function τ individual to the medium, by using both the decryption function ρ⁻¹ as the inverse function of the encryption function ρ individual to the digital AV information and the transferred σ⁻¹. Moreover, it is calculated by τ=ρ⁻¹ × σ⁻¹=ρ⁻¹*σ⁻¹ mod N.

$$\sigma^{-1} = \begin{pmatrix} 210, & 42 \\ 128, & 229 \end{pmatrix}$$

$$\tau = \rho^{-1} * \sigma^{-1} \bmod N = \begin{pmatrix} 80, & 53 \\ 173, & 114 \end{pmatrix}$$

The copyright management server 600 transfers the calculated decryption function τ to the magnetic disk unit 500. The magnetic disk unit 500 memorizes this decryption function τ.

When regenerating the recorded digital AV information, the information is regenerated by using the recorded decryption function τ in the magnetic disk unit 500.

$$M = \tau(C2) = \tau * C2 \bmod N$$

$$M = \begin{pmatrix} 80, & 53 \\ 173, & 114 \end{pmatrix} * \begin{pmatrix} 200 \\ 58 \end{pmatrix} \bmod 257 = \begin{pmatrix} 56 \\ 92 \end{pmatrix}$$

By this decrypting, the decrypted information is equal to the compressed data as the original information M, and then a regeneration process is finished by decompressing the compressed digital AV information.

SEVENTH EXAMPLE

Next, a seventh embodiment of the present invention will be described based on FIGS. 31 to 34. Moreover, the same portions as the aforementioned examples will be given the same symbols, and the description thereof will be omitted.

This example is a deformed example of the fifth embodiment, and is corresponding to claims 26 to 39, related to the copyright management system and the information process unit and method.

Hereafter, it will be described by taking a concrete example.

(Display Process)

An example of a display process for displaying the encrypted digital AV information related to the present invention will be described based on FIGS. 31 to 34.

For example, in order to store the digital AV information 20, a copy process or a display process to or from the removable recording medium 1 will be described.

Figure 31:
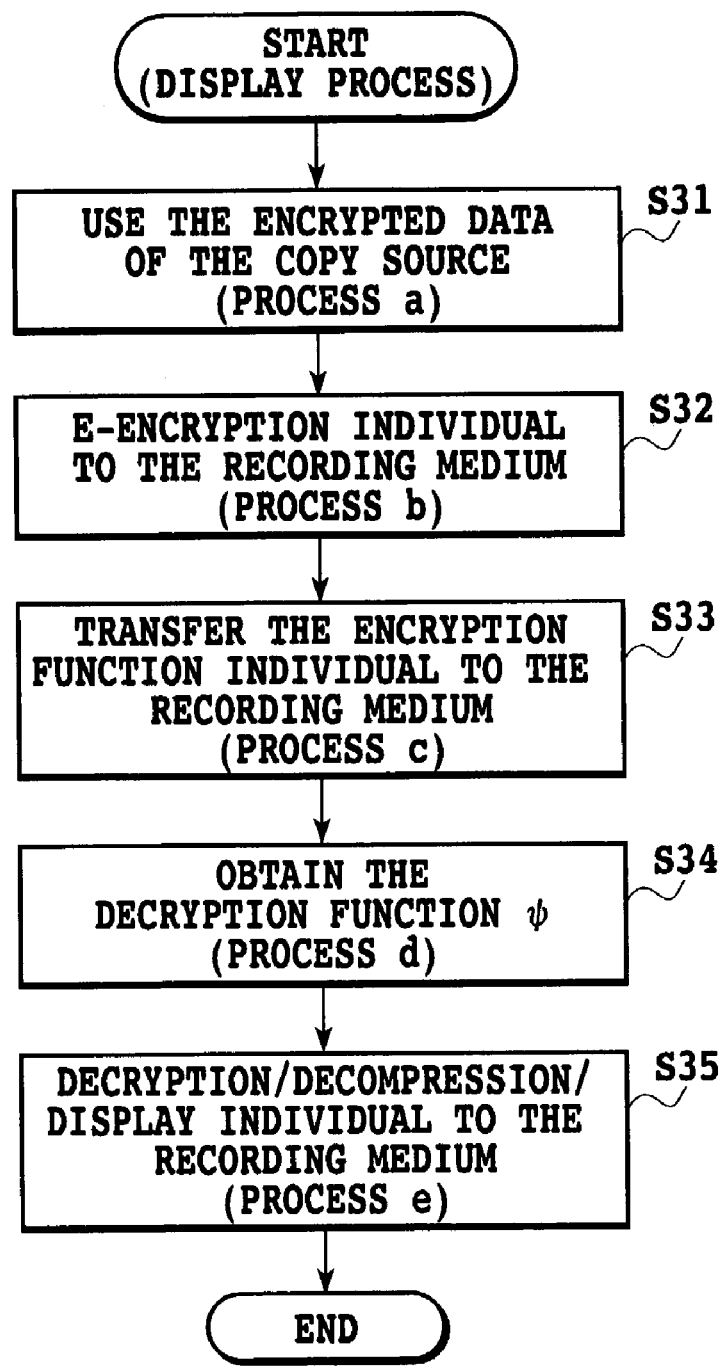
FIG. 31 is a flowchart showing an example of the display process according to a seventh embodiment of the present invention.

FIG. 31 is a flowchart showing the display process.

In a step S31, as shown in a process A in FIG. 32A, the above mentioned encrypted data C2 is used as the data of the copying source.

In a step S32, as shown in a process B in FIG. 32B, an encryption process is performed again by using both the encryption function φ individual to a copy destination medium and an encrypted data C2 of the copying source.

$$C3 = \phi(C2) = \phi * C2 \mod N$$

$$\phi = \begin{pmatrix} 214, & 84 \\ 6, & 244 \end{pmatrix} \quad \phi - 1 = \begin{pmatrix} 182, & 148 \\ 84, & 88 \end{pmatrix}$$

$$C3 = \begin{pmatrix} 214, & 84 \\ 6, & 244 \end{pmatrix} * \begin{pmatrix} 200 \\ 58 \end{pmatrix} \mod 257 = \begin{pmatrix} 127 \\ 189 \end{pmatrix}$$

Figure 33:
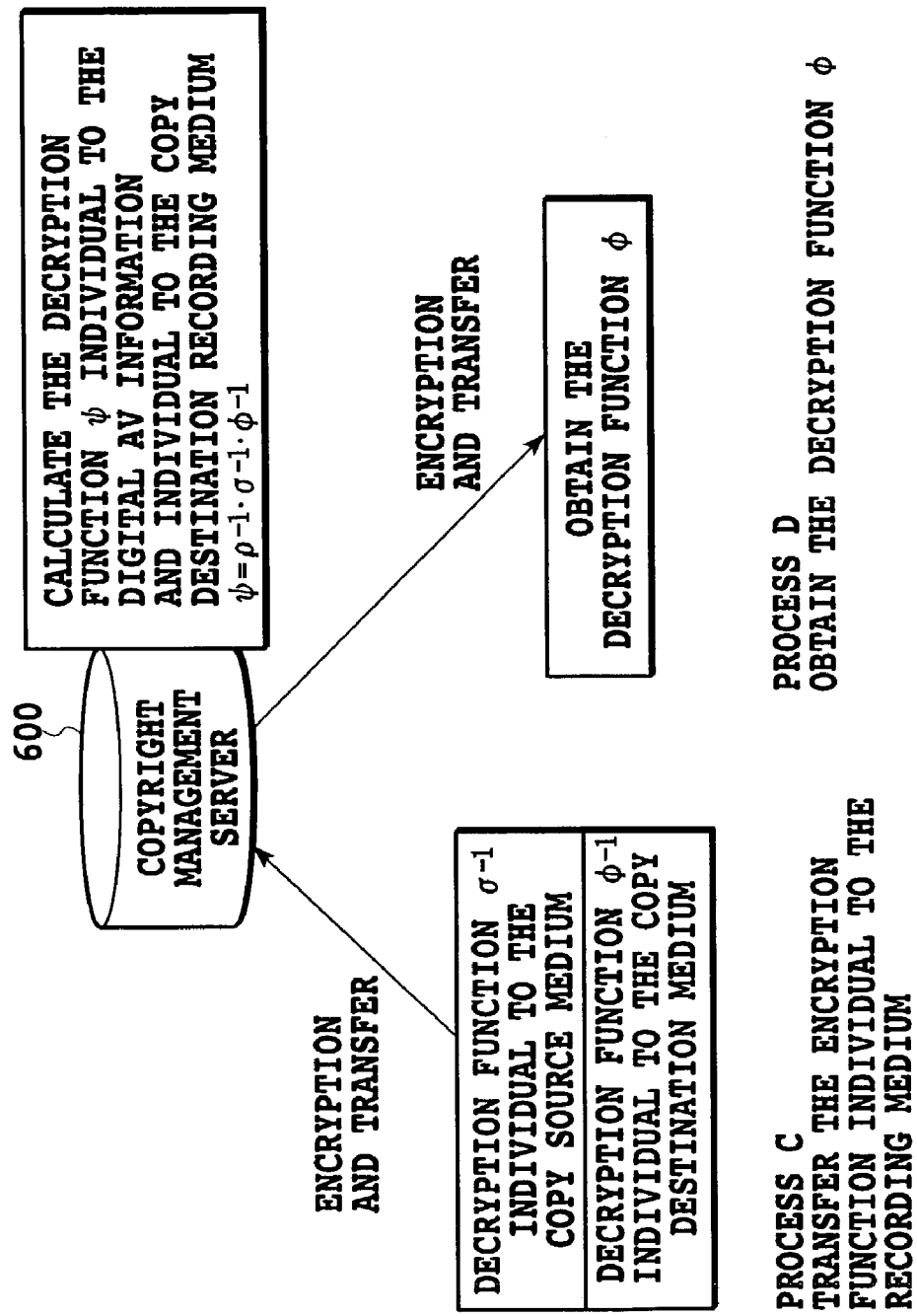
FIG. 33 is an explanatory view showing the display process of the digital AV information which is encrypted following FIGS. 32A and 32B.

In a step S33, as shown in a process C in FIG. 33, both the encryption function σ or the decryption function σ$^{-1}$ and the encryption function φ or the decryption function φ$^{-1}$ individual to the recording medium of a copy destination are transferred to the magnetic disk unit 500 via the digital telephone portion 540. This transfer process can be differentiated from a transfer process of ordinary regeneration by transferring an indication of a copy and two types of functions, that is, an encryption function or a decryption function individual to the recording medium. Therefore, a charge system can be divided into a regeneration process and a copy process. The copyright management server 600 calculates the decryption function ψ individual to the medium by using both the decryption function ρ$^{-1}$ included the server 600 and the transferred decryption functions σ$^{-1}$ and φ$^{-1}$. In the case where the transferred function is the encryption function, the decryption functions σ$^{-1}$ and φ$^{-1}$ individual to the medium can be obtained by calculating the inverse matrix.

$$\psi = \rho^{-1} \times \sigma^{-1} \times \phi^{-1} = \rho^{-1} * \sigma^{-1} * \phi^{-1} \mod N$$

$$\psi = \begin{pmatrix} 210, & 42 \\ 128, & 229 \end{pmatrix} * \begin{pmatrix} 5, & 255 \\ 136, & 152 \end{pmatrix} * \begin{pmatrix} 182, & 148 \\ 84, & 88 \end{pmatrix} \mod N = \begin{pmatrix} 251, & 56 \\ 199, & 170 \end{pmatrix}$$

The decryption function ψ individual to the calculated digital AV information as well as individual to the copy destination recording medium is transferred to the magnetic disk unit 500 via the digital telephone portion 540.

In a step S34, as shown in a process D in FIG. 33, the decryption function ψ sent from the copyright management server 600 is memorized.

Figure 34:
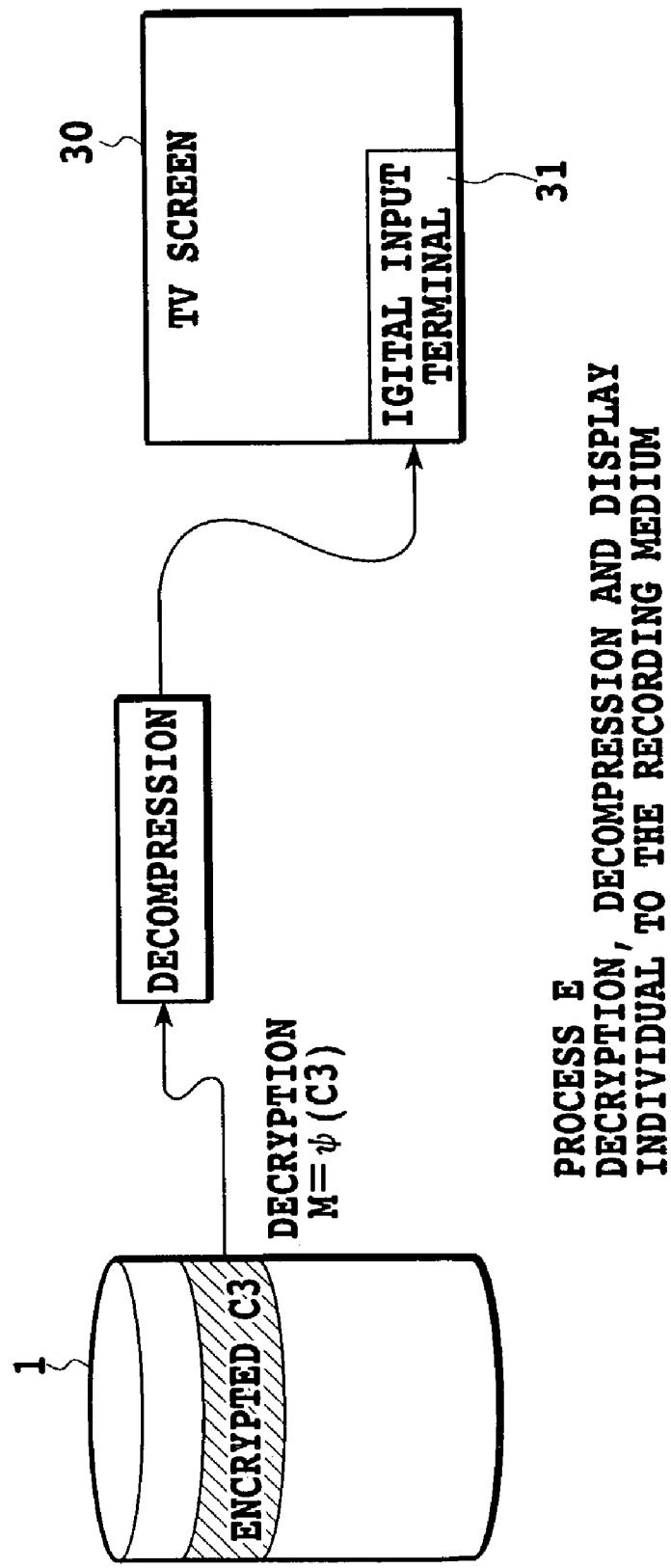
FIG. 34 is an explanatory view showing the display process of the digital AV information which is encrypted following FIG. 33.

In a step S35, as shown in a process E in FIG. 34, when seeing the encrypted data C3 recorded on the removable recording medium 1, the cipher of C3 is decrypted by using the transferred decryption function ψ.

$$M = \psi(C3) = \psi * C3 \mod N$$

$$M = \begin{pmatrix} 251, & 56 \\ 199, & 170 \end{pmatrix} * \begin{pmatrix} 127 \\ 189 \end{pmatrix} \mod 257 = \begin{pmatrix} 56 \\ 92 \end{pmatrix}$$

Thus, the encrypted recorded information is decoded to M as the original digital AV information.

$$M = \psi(C3) = \psi * C3 \mod N$$

$$= \begin{pmatrix} 114, & 81 \\ 127, & 32 \end{pmatrix} * \begin{pmatrix} 221 \\ 210 \end{pmatrix} \mod 257 = \begin{pmatrix} 56 \\ 92 \end{pmatrix}$$

As described above, the encrypted recorded information is converted into the compressed data as the original digital AV information, and then a regeneration is finished by decompressing the compressed digital AV information.

[Summary]

From the above description, the advantages can be summarized as follows.

(Advantage 1) As a different individual information is written on each the magnetic disc medium by the non-rewritable method, a system, in which the digital AV information can be handled as the data individual to the unit instead of the data in common to all so as to protect the copyright can be created.

(Advantage 2) As the digital AV information to be recorded is different for each magnetic disk unit, the copyright can be protected so that neither seeing nor hearing is performed even if an information content is copied on another magnetic disk unit or recording unit.

(Advantage 3) The media individual information 3 of the magnetic disk unit 500 and the magnetic disk medium 1 can be hidden from an audience including a hacker and a cracker so as to protect the copyright.

(Advantage 4) The copyright can be protected because the media individual information 3 cannot be obtained from an ordinary hard disk interface.

(Advantage 5) The copyright of the digital AV information can be securely protected on the route of outputting the information from the magnetic disk unit 500 to actual AV unit such as a television and an audio.

(Advantage 6) The digital AV information can be recorded based on a different encryption function by each digital AV information or each recording medium, on condition that an encryption function and a decryption function as individual informations are added to each recording medium and further an encryption function and a decryption function individual to the digital AV information are provided, and an encryption process is performed and recorded based on these two or more encryption functions. Thus, a copyright protection system can be provided in which information content cannot be regenerated based on a simple illegal copy because the decryption function individual to the medium is different and the decryption cannot be performed unless there are at least two or more decryption functions including decryption function of the recording medium and the digital AV information.

(Advantage 7) As the information individual to the magnetic disk medium is non-rewritable, the medium can be protected from interpolating of the data by a cracker and so on.

As described above, according to the present invention, it is possible to protect the copyright information such as the digital information recorded on the information recording medium by recording in advance the individual information different piece by piece at one or more locations in a data area.

In addition, according to the present invention, it is possible to prevent illegal act by interpolating of the individual information because the individual information recorded on the information recording medium can be read but cannot be rewritten by a recording-regenerating unit having an ordinary skill.

Furthermore, according to the present invention, it is possible to provide a copyright protection system incapable of regenerating by an illegal copy, because the same digital AV data can be stored as different data by each information recording medium on condition of adding the data including a different number individual to each piece of the medium and forming this different number as a part of a decryption key.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An information recording medium capable of magnetic recording and regenerating information, the medium comprising:
    a data area for recording data information; and
    a concave portion having a bottom surface for recording medium individual information including at least one bit of digital information,
    wherein the bottom surface of the concave portion is formed at a lower position than the position of the data area,
    wherein the medium individual information is recorded in the bottom surface such that a recording position of the bottom surface is located lower than the recording position of the data area, and
    wherein the recorded medium individual information in the bottom surface can be regenerated but cannot be rewritten as a part of an unprotected key of digital information including an individual number or an individual data for identification of the medium.

2. The information recording medium as recited in claim 1, wherein said medium individual information is recorded on an arbitrary track in each sector of the data area.

3. The information recording medium as recited in claim 1, wherein said digital information is a computer program.

4. The information recording medium as recited in claim 1, wherein said digital information is image information.

5. The information recording medium as recited in claim 1, wherein said medium individual information is written, by an information process unit for recording and regenerating the information, in a lower state of the number of revolutions than when writing predetermined data.

6. The information recording medium as recited in claim 1, wherein said medium individual information is written, by an information process unit for recording and regenerating the information, in a state of a higher write current than when writing predetermined data.

7. The information recording medium as recited in claim 1, wherein said medium individual information is written, by an information process unit for recording and regenerating the information, at a deeper position distance-wise in a medium depth direction than predetermined data, and the information cannot be rewritten by rewriting output of the data.

8. A copyright management system comprised of a management server and an information process unit for performing an information recording and regenerating process, wherein the unit includes an information recording medium as recited in claim 1, the system comprising:
    selecting means for, based on an instruction to start encryption by said management server, selecting desired digital information and the information process unit of a transfer destination;
    key transferring means for transferring a public key to the selected information process unit via communication means;
    individual information encrypting means for, by said information process unit, reading medium individual information as a decryption key of a cipher recorded in said information recording medium and encrypting the read medium individual information by using said transferred public key;
    individual information transferring means for transferring the encrypted medium individual information to said management server via the communication means;
    digital information encrypting means for, by said management server, encrypting said digital information by using the encrypted medium individual information;
    digital information transferring means for transferring the encrypted digital information to said information process unit via the communication means;
    recording means for, by said information process unit, recording the transferred encrypted digital information in said information recording medium; and
    digital information decoding means for decoding the encrypted digital information recorded in said information recording medium by using said medium individual information as the decryption key.

9. The copyright management system as recited in claim 8, wherein said management server generates an encryption function, for encrypting said digital information, corresponding to said medium individual information.

10. The copyright management system as recited in claim 9, wherein said management server performs accounting when performing encryption with said medium individual information.

11. The copyright management system as recited in claim 8, wherein, said information process unit transfers said medium individual information by digital radio when transferring its information to said management server.

12. The copyright management system as recited in claim 8, wherein said information process unit transfers said medium individual information directly to said management server therefrom, via no information equipment including a computer and AV equipment, when transferring its information to said management server.

13. The copyright management system as recited in claim 8, wherein said information process unit cannot read and write information individual to the information process unit and said medium individual information via said communication means.

14. The copyright management system as recited in claim 8, wherein, in the case of seeing and hearing said digital information encrypted and recorded by using said medium individual information, said information process unit decompresses said digital information decoded and then compressed and outputs its information directly to a television or audio equipment.

15. The copyright management system as recited in claim 8, wherein, in the case of managing said information recording medium and said digital information, said management server generates encryption functions individual to said information recording medium and said digital information respectively, and encrypts said information recording medium and said digital information by using said encryption functions, and said information recording medium and said digital information are decoded by using decryption keys corresponding to said encryption functions when decrypting.

16. The copyright management system as recited in claim 15, wherein a function system of said encryption function individual to said information recording medium is the same as a function system of said encryption function individual to said digital information.

17. The copyright management system as recited in claim 16, wherein, on condition that the encryption function of said information recording medium is equal to p and its function of said management server managing said digital information is equal to $\sigma$, a decode function $\tau$ is calculated as $\sigma^{-1} \times \rho^{-1}$ or $\rho^{-1} \times \sigma^{-1}$.

18. The copyright management system as recited in claim 17, wherein, in calculation of the encryption functions, each element as a result of the multiplication is divided by a predetermined prime number to produce a remainder as a solution.

19. A server for exchanging information with an information process unit having an information recording medium as recited in claim 1, the server comprising:
selecting means for selecting desired digital information and the information process unit according to a transfer destination based on an instruction for starting encryption;
key transferring means for transferring a public key to the selected information process unit via communication means;
digital information encrypting means for encrypting said digital information by using the encrypted medium individual information; and
digital information transferring means for transferring the encrypted digital information to said information process unit via the communication means.

20. An information process unit for recording and regenerating information, and for having an information recording medium as recited in claim 1, the unit comprising:
individual information encrypting means for reading medium individual information as a decryption key of a cipher recorded in said information recording medium, and encrypting the read medium individual information by using a public key transferred from a server;
individual information transferring means for transferring the encrypted medium individual information to said management server via the communication means;
recording means for recording the encrypted digital information transferred from said server in said information recording medium; and
digital information decoding means for decoding the encrypted digital information recorded in said information recording medium by using said medium individual information as the decryption key.

21. A copyright management method for managing copyright information between a management server and an information process unit, wherein the unit having an information recording medium as recited in claim 1, said method comprising the steps of:
selecting, by said management server, desired digital information and the information process unit according to a transfer destination based on an instruction for starting encryption; transferring a public key to the selected information process unit via communication means;
reading, by said information process unit, medium individual information as a decryption key of a cipher recorded in said information recording medium, and encrypting the read medium individual information by using the transferred public key;
transferring the encrypted medium individual information to said management server via the communication means;
encrypting, by said management server, said digital information by using the encrypted medium individual information so that a decoding process can be performed based on said medium individual information;
transferring the encrypted digital information to said information process unit via the communication means;
recording, by said information process unit, the transferred encrypted digital information in said information recording medium; and
decoding the encrypted digital information recorded in said information recording medium by using said medium individual information as the decryption key.

22. An information recording medium capable of magnetic recording and regenerating information, the medium comprising:
a data area for recording data information; and
a concave portion having a bottom surface for recording medium individual information including at least one bit of digital information,
wherein the bottom surface of the concave portion is formed at a lower position than the position of the data area,
wherein the medium individual information is recorded in the bottom surface such that a recording position of the bottom surface is located lower than the recording position of the data area, and
wherein the recorded medium individual information is read and is encrypted by an information process unit, and the encrypted medium individual information is transferred to a management server and is used for encrypting digital information, and further the encrypted digital information is transferred to the information process unit and is decrypted using the medium individual information.

* * * * *